US010884347B2

(12) United States Patent
Ogawa et al.

(10) Patent No.: US 10,884,347 B2
(45) Date of Patent: Jan. 5, 2021

(54) SUPPORT FOR DIP COATING, ELECTROPHOTOGRAPHIC PHOTORECEPTOR, PROCESS CARTRIDGE, AND IMAGE FORMING APPARATUS

(71) Applicant: FUJI XEROX CO., LTD., Tokyo (JP)

(72) Inventors: Hiroaki Ogawa, Kanagawa (JP); Masaru Agatsuma, Kanagawa (JP); Akihiko Nakamura, Kanagawa (JP); Kenta Shingu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/379,806

(22) Filed: Apr. 10, 2019

(65) Prior Publication Data

US 2020/0089136 A1 Mar. 19, 2020

(30) Foreign Application Priority Data

Sep. 14, 2018 (JP) ................................ 2018-172101

(51) Int. Cl.

| | |
|---|---|
| ***G03G 5/10*** | (2006.01) |
| ***G03G 5/05*** | (2006.01) |
| ***H04N 5/3745*** | (2011.01) |
| ***G03G 21/18*** | (2006.01) |

(52) U.S. Cl.

CPC ............... *G03G 5/05* (2013.01); *G03G 5/102* (2013.01); *G03G 21/18* (2013.01); *H04N 5/37455* (2013.01)

(58) Field of Classification Search

CPC ................................ G03G 5/10; G03G 5/102

See application file for complete search history.

(56) References Cited

U.S. PATENT DOCUMENTS

| | | | | |
|---|---|---|---|---|
| 6,391,394 B1 * | 5/2002 | Shirasuna | C23C 16/0227 | 134/29 |
| 2003/0190540 A1 * | 10/2003 | Shoshi | C07D 209/66 | 430/78 |
| 2004/0234294 A1 * | 11/2004 | Nagame | G03G 21/0017 | 399/159 |
| 2011/0129770 A1 * | 6/2011 | Aoki | G03G 5/0507 | 430/66 |

FOREIGN PATENT DOCUMENTS

| | | | |
|---|---|---|---|
| JP | 09-292730 | * 11/1997 | G03G 5/10 |
| JP | 2000089611 | 3/2000 | |
| JP | 2017134390 | 8/2017 | |

OTHER PUBLICATIONS

Translation of JP 09-292730.*

* cited by examiner

*Primary Examiner* — Peter L Vajda
(74) *Attorney, Agent, or Firm* — JCIPRNET

(57) ABSTRACT

A support for dip coating, wherein the inner peripheral surface at an end in the axial direction of the support has an arithmetic average roughness Ra of 0.26 μm or less and a maximum height roughness Rz of 2.3 μm or less.

17 Claims, 16 Drawing Sheets

SUPPORT FOR DIP COATING, ELECTROPHOTOGRAPHIC PHOTORECEPTOR, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2018-172101 filed Sep. 14, 2018.

BACKGROUND

(i) Technical Field

The present disclosure relates to a support for dip coating, an electrophotographic photoreceptor, a process cartridge, and an image forming apparatus.

(ii) Related Art

Japanese Unexamined Patent Application Publication No. 2017-134390 discloses a photoreceptor including a cylindrical substrate having a coating film on the outer peripheral surface of a cylindrical conductive support, and a flange having a cylindrical fitting part with the outer peripheral surface fixed to the inner peripheral surface at an end of the cylindrical substrate. In the conductive support, the end inner peripheral surface in contact with the flange has a surface roughness Rz of 3 to 10 μm, and the end inner peripheral surface in contact with the flange has a water-repellent resin film.

Japanese Unexamined Patent Application Publication No. 2000-089611 discloses a cylindrical electrophotographic photoreceptor including an aluminum-based cylindrical substrate which has an anodized surface and flanges fitted to both ends thereof. The conductive flanges are fitted to the cylindrical substrate in which at least one flange fitting part has an inner surface with a surface roughness maximum height Rmax of 5 μm or more.

SUMMARY

When a layer is formed on the outer peripheral surface of a cylindrical support by a dip coating method, for example, the support is dipped in a coating solution in the state where the inner peripheral surface at the upper end is held. In this case, the upper end of the support is closed with a holding member, and thus the coating solution hardly enters into the support even when the support is dipped in the coating solution. However, the coating solution may enter the inner peripheral surface at the lower end of the support due to liquid pressure, and the coating solution adhering to the inner peripheral surface may be dried to form a film. In addition, even when after the layer is formed on the outer peripheral surface of the support, an attempt is made to remove a coating film by, for example, wiping the inner peripheral surface or washing the inner peripheral surface with a solvent, or the like, the coating film may not be easily removed and may remain on a portion of the inner peripheral surface depending on the conditions of the inner peripheral surface of the support.

Aspects of non-limiting embodiments of the present disclosure relate to a support for dip coating, the support having excellent removability of coating film from the inner peripheral surface as compared with when the inner peripheral surface has an arithmetic average roughness Ra exceeding 0.26 μm and a maximum height roughness Rz exceeding 2.3 μm at an end in the axial direction.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the disclosure, there is provided a cylindrical support for dip coating, the inner peripheral surface having an arithmetic average roughness Ra of 0.26 μm or less and a maximum height roughness Rz of 2.3 μm or less at an end in the axial direction of the support.

BRIEF DESCRIPTION OF THE DRAWINGS

Exemplary embodiments of the present disclosure will be described in detail based on the following figures, wherein.

DETAILED DESCRIPTION

Figure 1C:
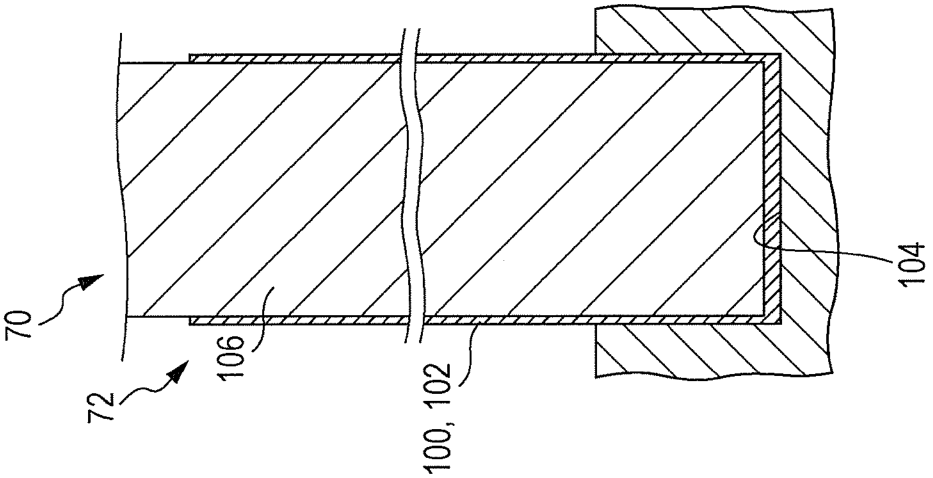
FIGS. 1A, 1B, and 1C are schematic drawings showing an impact processing apparatus according to an exemplary embodiment of the present disclosure.

Exemplary embodiments of the present disclosure are described below.

[Support for Dip Coating]

First Exemplary Embodiment

A support for dip coating (also referred to as a "support" hereinafter) according to a first exemplary embodiment has a cylindrical shape and has an inner peripheral surface having an arithmetic average roughness Ra of 0.26 μm or less and having a maximum height roughness Rz of 2.3 μm or less at an end in the axial direction.

The support according to the first exemplary embodiment having the configuration described above has excellent removability of coating film from the inner peripheral surface.

When a layer is formed on the outer peripheral surface of the cylindrical support by a dip coating method, for example, the support is dipped in a coating solution in the state where the inner peripheral surface at the upper end of the support is held. In this case, the inner peripheral surface at the upper end is held by a holding member, and thus the coating solution hardly enters into the support even when the support is dipped in the coating solution. However, the coating solution may enter the inner peripheral surface at the lower end of the support due to liquid pressure, and the coating solution adhering to the inner peripheral surface may be dried to form a film.

In addition, even when an attempt is made to remove the coating film, formed on the inner peripheral surface, by wiping, washing with a solvent, or the like, the coating film may not be easily removed and may remain on a portion of the inner peripheral surface depending on the conditions of the inner peripheral surface of the support. For example, when the inner peripheral surface of the support has irregularities, the coating solution entering the irregularities becomes a coating film, which may not be easily removed even by wiping or washing with a solvent.

When a member in which a layer is formed on the outer peripheral surface of the support by a dip coating method is a member (for example, an electrophotographic photoreceptor, a fixing roller, or the like) used by being rotated while the inner peripheral surface of the support is held, the coating film remaining on a portion of the inner peripheral surface at an end in the axial direction of the support may decrease rotational accuracy due to deviation of the rotation axis or the like. In particular, in the case of a member rotated with a flange mounted at an end of the support, rotational accuracy may be decreased due to flange displacement or the like.

In addition, even when after a layer is formed on the outer peripheral surface of the support by a dip coating method, the support is reused after the layer formed is removed, and a layer is again formed by a dip coating method, the use of the support having the coating film remaining on the inner peripheral surface may have the influence of the remaining coating film on the formation of the layer for reuse.

However, in the first exemplary embodiment, the inner peripheral surface has an arithmetic average roughness Ra of 0.26 μm or less and a maximum height roughness Rz of 2.3 μm or less at an end in the axial direction. Therefore, even when a coating film is formed on the inner peripheral surface by dipping in the coating solution from one end in the axial direction, the adhesive force due to the anchoring effect between the inner peripheral surface and the coating film is considered to be decreased, thereby making the coating film easy to remove.

In addition, in the first exemplary embodiment, when the member having a layer, formed on the outer peripheral surface of the support by a dip coating method, is used by being rotated while the inner peripheral surface is held, a coating film on the inner peripheral surface of the support is easily removed, thereby suppressing a decrease in rotational accuracy due to deviation of the rotation axis or the like. Further, in the first exemplary embodiment, when after a layer is formed on the outer peripheral surface of the support by a dip coating method, the support is reused after the layer formed is removed, the coating film on the inner peripheral surface of the support can be easily removed, thereby realizing cost reduction in reuse.

Herein, the inner peripheral surface at an end in the axial direction represents the inner peripheral surface within a range of 5 mm from one of the edge portions to a central portion in the axial direction. Also, an end in the axial direction is the end on the lower side during dip coating, that is, the end on the side first brought into contact with the coating solution during dip coating.

The arithmetic average roughness Ra of the inner peripheral surface is the average absolute value of heights of a roughness curve with a reference length, specified by JIS B0601 (2013). The value is measured by a surface roughness tester (Surfcom, manufactured by Tokyo Seimitsu Co., Ltd.). That is, the arithmetic average roughness Ra of the inner peripheral surface at an end in the axial direction is the value measured by the method described above within a range of 5 mm from one of the edge portions to a central portion in the axial direction of the inner peripheral surface.

Also, the maximum height roughness Rz of the inner peripheral surface is the total of the maximum value of peak heights and the maximum value of valley depths in a reference length of a roughness curve. The value is measured by a surface roughness tester (Surfcom, manufactured by Tokyo Seimitsu Co., Ltd.). That is, the maximum height roughness Rx of the inner peripheral surface at an end in the axial direction is the value measured by the method described above within a range of 5 mm from one of the edge portions to a central portion in the axial direction of the inner peripheral surface. Details of the measurement method are described later.

Second Exemplary Embodiment

A support for dip coating (also referred to as a "support" hereinafter) according to a second exemplary embodiment has a cylindrical shape and an inner peripheral surface with a glossiness of 250 or more at an end in the axial direction.

The support according to the second exemplary embodiment having the configuration described above is excellent in coating film removability from the inner peripheral surface.

As described above, when a layer is formed on the outer peripheral surface of the cylindrical support by a dip coating method, the coating solution may enter the inner peripheral surface of the support due to pressure, and the coating solution adhering to the inner peripheral surface may be dried to form a coating film. In addition, even when an attempt is made to remove the coating film formed on the inner peripheral surface by wiping, washing with a solvent, or the like, the coating film may not be easily removed and may remain on a portion of the inner peripheral surface depending on the conditions of the inner peripheral surface of the support. For example, when the inner peripheral surface of the support has irregularities, the coating solution entering the irregularities becomes a coating film, which may be made hard to remove even by wiping or washing with a solvent.

On the other hand, in the second exemplary embodiment, the inner peripheral surface at an end in the axial direction has a glossiness of 250 or more. That is, the inner peripheral surface at an end in the axial direction of the support is brought into a state close to a mirror finish. Therefore, even when a coating film is formed on the inner peripheral surface by dipping in the coating solution from the one end side in the axial direction, the adhesive force by the anchoring effect between the inner peripheral surface and the coating film is considered to be decreased due to the smoothness of the inner peripheral surface, thereby making the coating film easy to remove.

In addition, in the second exemplary embodiment, when the support having a layer formed on the outer peripheral surface of the support by a dip coating method is used by being rotated while the inner peripheral surface of the support is held, a coating film on the inner peripheral surface of the support is easily removed, thereby suppressing a decrease in rotational accuracy due to deviation of the rotation axis or the like. Further, in the second exemplary embodiment, when after a layer is formed on the outer peripheral surface of the support, the support is reused after the layer formed is removed, the coating film on the inner peripheral surface of the support can be easily removed, thereby realizing cost reduction in reuse.

Herein, the inner peripheral surface at one end in the axial direction represents the inner peripheral surface within a range of 5 mm from one of the edge portions to a central portion in the axial direction. Also, as described above, one end in the axial direction is the end on the lower side during dip coating, that is, the end on the side first brought into contact with the coating solution during dip coating.

The glossiness of the inner peripheral surface at an end in the axial direction is the value of glossiness measured within a range of 5 mm from one of the edge portions to a central portion in the axial direction of the inner peripheral surface. Details of the measurement method are described later.

Hereinafter, the first exemplary embodiment and the second exemplary embodiment are referred to as the "exemplary embodiment of the present disclosure" as a generic name.

Details of the support according to the exemplary embodiment of the present disclosure are described below.

<Support>

The material constituting the support is, for example, a metal, and examples thereof include pure metals such as aluminum, iron, copper, and the like, and alloys such as stainless steel, aluminum alloys, and the like.

From the viewpoint of lightness and excellent processability, the metal constituting the support is preferably a metal containing aluminum, and more preferably pure aluminum or an aluminum alloy. The aluminum alloy is not particularly limited as long as it is an alloy containing aluminum as a principal component. For example, an aluminum alloy containing Si, Fe, Cu, Mn, Mg, Cr, Zn, Ti, or the like other than aluminum can be used. The term "principal component" represents the element at the highest content (by weight) among the elements contained in an alloy.

From the viewpoint of processability, the metal constituting the support is a metal preferably having an aluminum content (by weight) of 90.0% or more, more preferably having an aluminum content of 95.0% or more, and still more preferably 99.0% or more.

The shape of the support is not particularly limited as long as it is a cylindrical shape.

The thickness (wall thickness) of the support is, for example, 0.1 mm or more and 2.0 mm or less, preferably 0.2 mm or more and 0.9 mm or less, and more preferably 0.4 mm or more and 0.8 mm or less.

The diameter and axial direction length of the support are not particularly limited and are values varying with applications and the like. When the support is a support for an electrophotographic photoreceptor, the diameter of the support is, for example, within a range of 20 mm or more and 100 mm or less, and the axial direction length of the support is, for example, within a range of 240 mm or more and 500 mm or less.

In the first exemplary embodiment, the arithmetic average roughness Ra of the inner peripheral surface at one end in the axial direction of the support is 0.26 μm or less, preferably 0.20 μm or less, and more preferably 0.15 μm or less. Also, in the first exemplary embodiment, the maximum height roughness Rz of the inner peripheral surface at one end in the axial direction of the support is 2.3 μm or less, preferably 1.5 μm or less, and more preferably 1.0 μm or less.

In the second exemplary embodiment, the arithmetic average roughness Ra of the inner peripheral surface at one end in the axial direction of the support is 0.26 μm or less, preferably 0.20 μm or less, and more preferably 0.15 μm or less. Also, in the second exemplary embodiment, the maximum height roughness Rz of the inner peripheral surface at one end in the axial direction of the support is 2.3 μm or less, preferably 1.5 μm or less, and more preferably 1.0 μm or less.

From the viewpoint of coating film removability from the inner peripheral surface, the arithmetic average roughness Ra of the inner peripheral surface at one end in the axial direction of the support and the maximum height roughness Rz of the inner peripheral surface at one end in the axial direction of the support preferably satisfy formula (1) below, more preferably satisfy formula (2) below, and still more preferably satisfy formula (3) below.

$$7.7 \times Ra \leq Rz \leq 10.4 \times Ra \quad \text{Formula(1):}$$

$$8.1 \times Ra \leq Rz \leq 10 \times Ra \quad \text{Formula (2):}$$

$$8.5 \times Ra \leq Rz \leq 9.7 \times Ra \quad \text{Formula(3):}$$

In addition, the arithmetic average roughness Ra and the maximum height roughness Rz of the inner peripheral surface at the other end in the axial direction of the support and of the inner peripheral surface other than both ends are not particularly limited. The arithmetic average roughness Ra and the maximum height roughness Rz of the inner peripheral surface at both ends of the support may be within the respective ranges described above, and the arithmetic average roughness Ra and the maximum height roughness Rz of the inner peripheral in a region other than both ends in the axial direction of the support may be within the respective ranges described above.

The arithmetic average roughness Ra and the maximum height roughness Rz are measured as follows.

The surface shape (roughness curve) is measured by scanning in the axial direction of the inner peripheral surface of the support within a region of 5 mm from one of the ends to a central position in the axial direction. Scanning in the axial direction is performed a total of 36 times at intervals of 10° in the circumferential direction.

The measurement is performed by using a surface roughness tester (Surfcom, manufactured by Tokyo Seimitsu Co., Ltd.) under the conditions including a measurement length of 2.5 mm, a cutoff wavelength of 0.8 mm, and a measurement speed of 0.60 mm/s.

The arithmetic average roughness Ra and the maximum height roughness Rz are calculated based on the roughness curve obtained by the scanning.

Specifically, the arithmetic average roughness Ra is calculated by determining the "average absolute value of heights of roughness curve" based on the 36 roughness curves.

The maximum height roughness Rz is calculated by determining the "total of the maximum value of peak height and the maximum value of valley depth" based on the 36 roughness curves.

A method for controlling the arithmetic average roughness Ra and the maximum height roughness Rz at one end in the axial direction of the support within the respective ranges described above is not particularly limited.

As described later, when the support is produced through impact pressing and ironing, the arithmetic average roughness Ra and the maximum height roughness Rz are controlled by, for example, adjusting the arithmetic average roughness Ra of the outer peripheral surface of the punch (that is, a cylindrical mold 80 shown in FIG. 2) used for ironing and the kinetic viscosity of the lubricant used. The arithmetic average roughness Ra of the outer peripheral surface of the punch used for ironing is, for example, 0.6 μm or less, preferably 0.4 μm or less, and more preferably 0.3 μm or less. In addition, the kinetic viscosity of the lubricant at 40° C. used between the outer peripheral surface of the punch and the inner peripheral surface of the support in ironing is, for example, 400 $mm^2/s$ or less, preferably 250 $mm^2/s$ or less, and more preferably 150 $mm^2/s$ or less.

The kinetic viscosity of the lubricant at 40° C. is the value measured according to JIS K 2283: 2000.

Also, when the support is produced by drawing or the like, the arithmetic average roughness Ra and the maximum height roughness Rz are controlled by, for example, lapping, with a film of specific No. count, the inner peripheral surface of a cylindrical pipe obtained by drawing or spraying particles containing at least one of a resin and rubber.

The volume-average particle diameter of the particles containing at least one of a resin and rubber is, for example, within a range of 0.3 mm or more and 0.8 mm or less. The volume-average particle diameter is the value measured by a laser diffraction particle size distribution analyzer (LS13320 manufactured by Beckman-Coulter Inc.).

In the first exemplary embodiment, the glossiness of the inner peripheral surface at an end in the axial direction of the support is preferably 250 or more, more preferably 300 or more, and still more preferably 500 or more.

In the second exemplary embodiment, the glossiness of the inner peripheral surface at one end in the axial direction of the support is preferably 250 or more, more preferably 300 or more, and still more preferably 500 or more.

In addition, the glossiness of the inner peripheral surface at the other end and of the inner peripheral surface in a region other than both ends in the axial direction of the support is not particularly limited. The glossiness of the inner peripheral surface at both ends in the axial direction of the support may be within the range described above, and the glossiness of the inner peripheral surface in a region other than both ends in the axial direction of the support may be within the range described above.

The glossiness of the inner peripheral surface at one end in the axial direction of the support is measured as follows.

The support is cut open into semicircles and then processed into a flat plate by pressing. Glossiness of the inner peripheral surface of the flat plate is measured by a gloss checker (IG-410, manufactured by HORIBA, Ltd.) for a region of 5 mm from one of the edges to a central position in the axial direction. The glossiness is the value measured according to JIS Z 8741.

A method for controlling the glossiness of the inner peripheral surface at one end in the axial direction of the support within the range described above is not particularly limited. For example, when the support is produced through impact pressing and ironing, the glossiness is controlled by, for example, adjusting the arithmetic average roughness Ra of the outer peripheral surface of the punch used for ironing and the kinetic viscosity of the lubricant used. Also, when the support is produced by drawing or the like, the glossiness is controlled by, for example, lapping the inner peripheral surface of the resultant cylindrical pipe or spraying particles containing at least one of a resin and rubber.

The arithmetic average roughness Ra and the maximum height roughness Rz of the outer peripheral surface of the support are not particularly limited and are values varying according to applications or the like. When the support is a support for an electrophotographic photoreceptor, the arithmetic average roughness Ra of the outer peripheral surface of the support is, for example, within a range of 0.05 μm or more and 2.0 μm or less, and the maximum height roughness Rz of the outer peripheral surface of the support is, for example, within a range of 0.3 μm or more and 2.5 μm or less.

The support may be a conductive support. In particular, a support for an electrophotographic photoreceptor described later is preferably a conductive support. The term "conductive" represents that the volume resistivity is less than $10^{13}$ Ωcm.

<Method for Producing Support>

The support is produced by, for example, known molding such as drawing, squeezing, impact pressing, ironing, cutting, etc. From the viewpoint of thinning and increasing hardness, the support is preferably produced by impact pressing and is more preferably produced by impact pressing and consequent ironing. That is, the support is preferably an impact-pressed article or an impact-pressed article subjected to ironing.

—Impact Pressing—

The impact pressing is a processing method for molding by striking, with a cylindrical male mold, a metal slug disposed in a circular female mold into a hollow cylinder along the cylindrical male mold. After the hollow cylinder is molded by impact pressing, the inner diameter, the outer diameter, cylindricity, and circularity are adjusted by one or plural times of ironing, thereby producing the support. After ironing, both ends of the cylindrical pipe may be cut off and the end surfaces may be further treated. An example of impact pressing and ironing is described below.

An example of the method for producing the support is described with reference to FIGS. 1 to 11.

In the description below, the finally produced cylindrical member is referred to as the "cylindrical member after molding" or the support. In addition, members having substantially the same function are denoted by the same numerical reference through all drawings, and duplicated description and numerical references may be omitted. In the drawings, an arrow UP represents the upper portion in the vertical direction.

First, an apparatus 70 for producing a cylindrical member is described, and then the method for producing a support (cylindrical member) by using the apparatus 70 for producing a cylindrical member is described.

—Principal Configuration: Apparatus for Producing Cylindrical Member—

The apparatus 70 for producing a cylindrical member includes an impact processing apparatus 72 which molds a cylindrical member 100, an ironing apparatus 74 which corrects the shape of the cylindrical member 100 and a blasting apparatus 76 which imparts irregularities to the outer peripheral surface of the cylindrical member 100.

The impact processing apparatus 72, the ironing apparatus 74, and the blasting apparatus 76 are described in that order below.

(Impact Processing Apparatus)

Figure 1B:
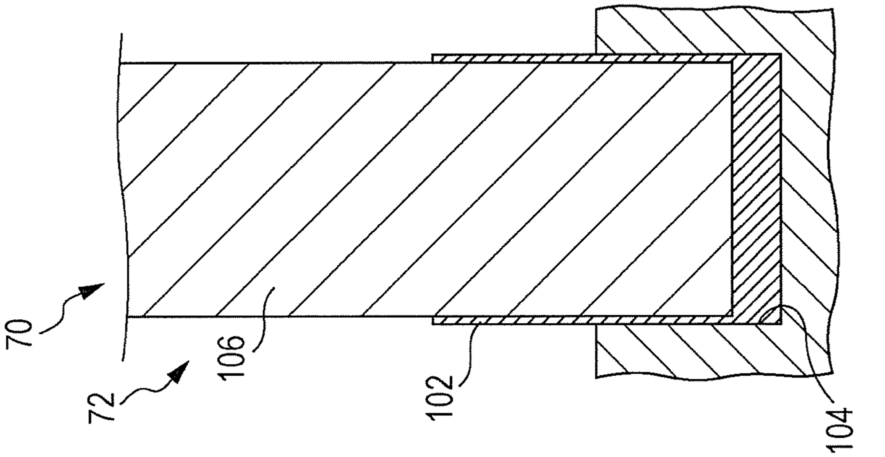
Figure 1A:
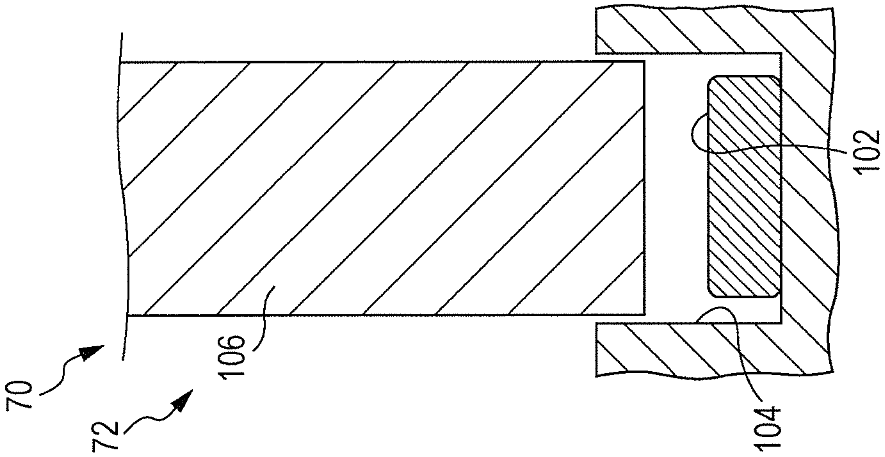

As shown in FIG. 1A, the impact processing apparatus 72 includes a concave mold 104 in which a slug 102 as an aluminum slug is placed, and a cylindrical punch mold 106 which molds the slug 102 placed in the concave mold 104 into a cylindrical member by pressing the slug.

The operation of each of the parts of the impact processing apparatus 72 is described later in "Function". Using the impact processing apparatus 72 molds the cylindrical member 100 (refer to FIG. 4B) having an open end 100A and a bottom plate 100B at the other end.

(Ironing Apparatus)

Next, the ironing apparatus 74 is described. The ironing apparatus 74 is described basically with respect to a mold structure provided in the ironing apparatus 74.

Figure 2:
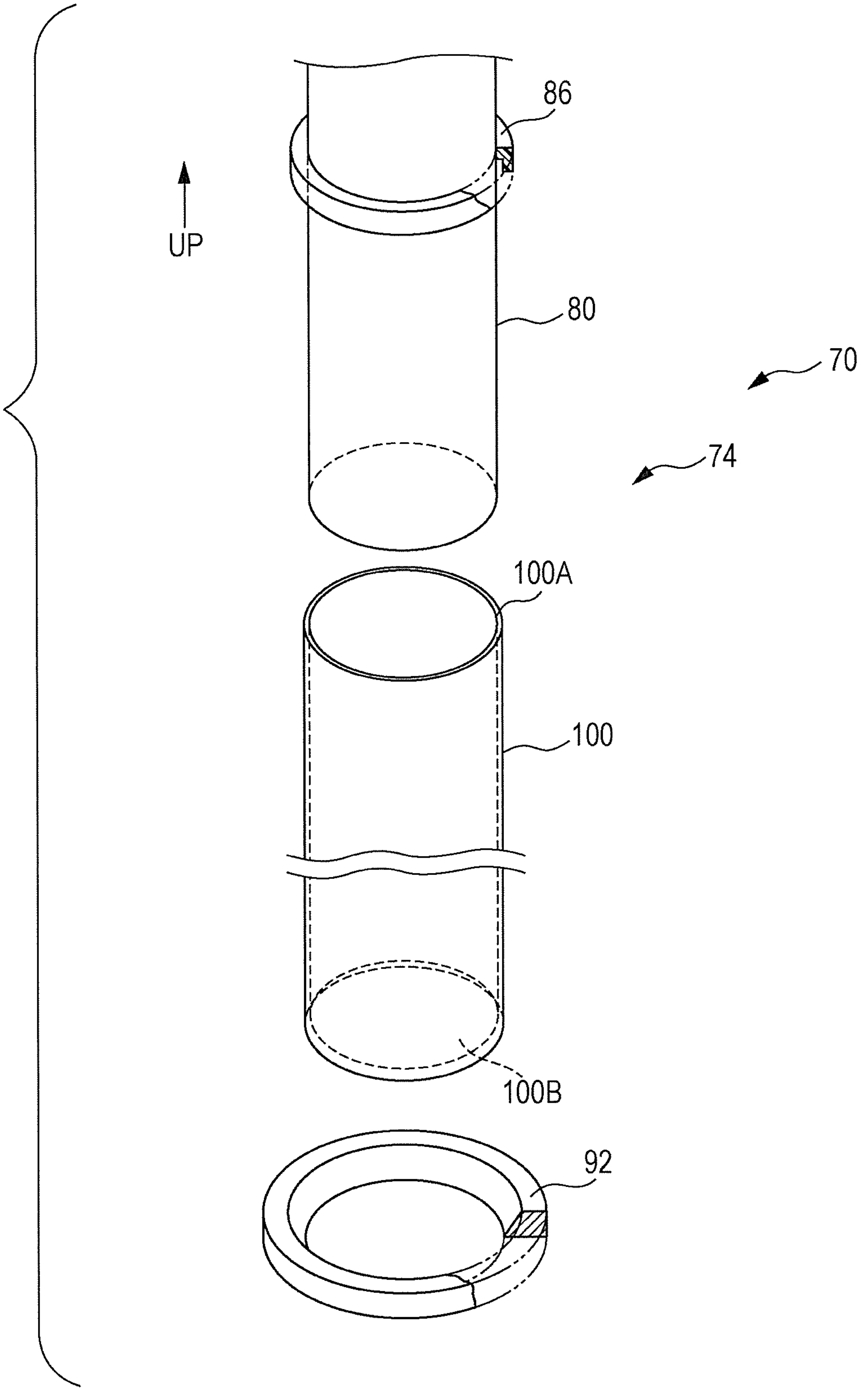
FIG. 2 is a schematic drawing showing an ironing apparatus according to an exemplary embodiment of the present disclosure.

As shown in FIG. 2, the ironing apparatus 74 includes a cylindrical mold 80 having a tip-side part to be inserted into the cylindrical member 100 molded by impact processing, and a suppression member 86 which suppresses the motion of the one end 100A of the cylindrical member 100. The ironing apparatus 74 further includes a pressing mold 92 which presses the cylindrical member 100 to the outer peripheral surface of the cylindrical mold 80, and a release member 96 (refer to FIG. 9) which releases the cylindrical member 100 from the cylindrical mold 80.

The cylindrical mold 80 is formed by, for example, using die steel (JIS-G4404: SKD11), and, as shown in FIG. 2, it has a cylindrical shape extending in the vertical direction. In addition, the outer diameter (D1 in FIG. 5) of the cylindrical mold 80 is smaller than the inner diameter (D2 inn FIG. 5) of the cylindrical member 100.

Figure 5:
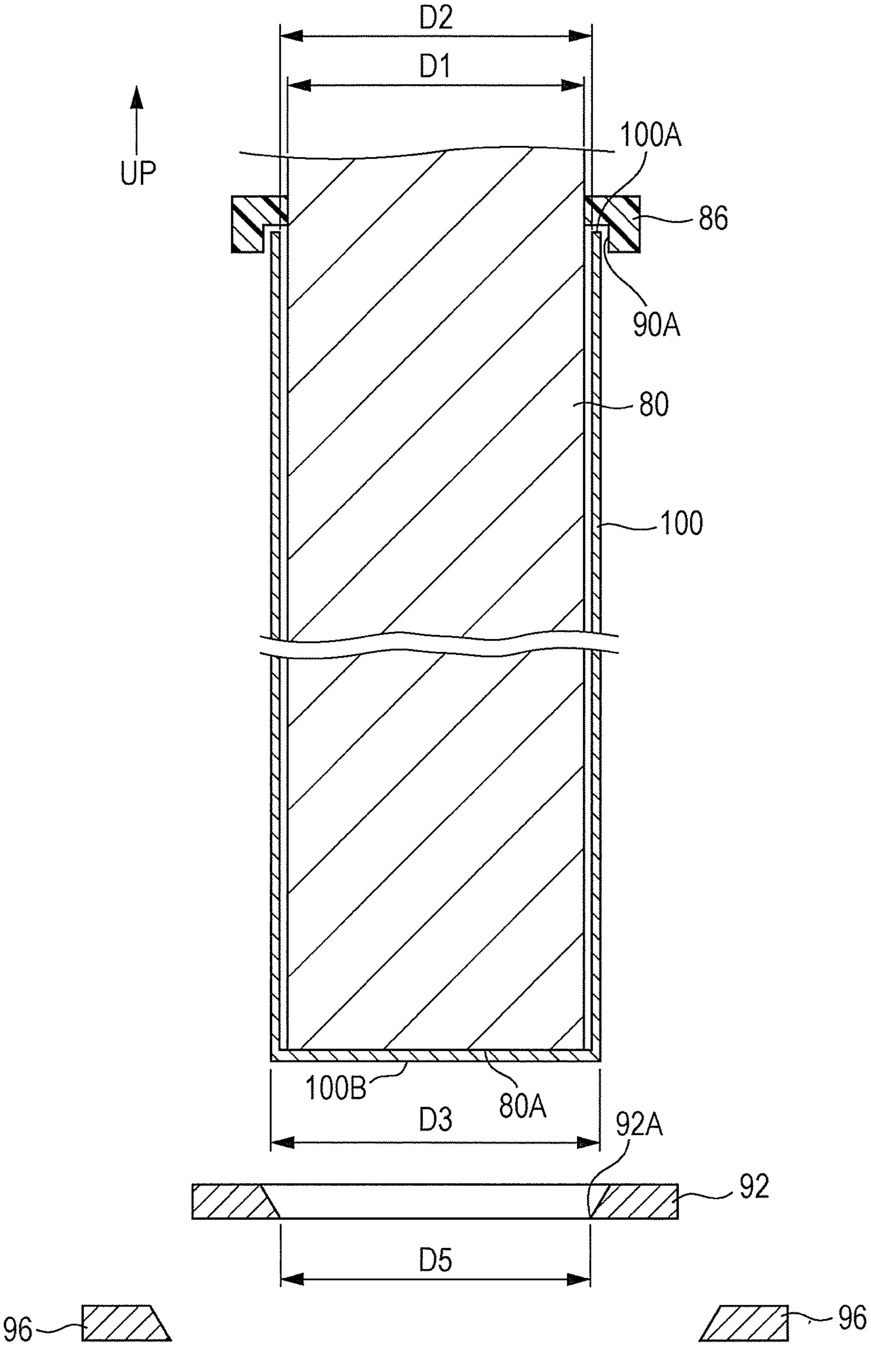
FIG. 5 is a sectional view showing a mold structure according to an exemplary embodiment of the present disclosure.

Therefore, as shown in FIG. 5, in the state where the tip-side part 80A of the cylindrical mold 80 having the tip-side part (lower part in the drawing) to be inserted into the cylindrical member 100 comes in contact with the bottom plate 100B of the cylindrical member 100 (hereinafter, referred to as the state where the cylindrical member 100 is attached to the cylindrical mold 80), a gap is formed between the outer peripheral surface of the cylindrical mold 80 and the inner peripheral surface of the cylindrical member 100.

In this configuration, driving force is transmitted to the cylindrical mold 80 from a driving source (not shown) so as to move the cylindrical mold 80 vertically.

The pressing mold 92 is formed by, for example, using cemented carbide (JIS B 4053-V10), and, as shown in FIG. 2, it has an annular shape. Also, as shown in FIG. 5, the pressing mold 92 is disposed so that the center line thereof is overlapped with the center line of the cylindrical mold 80. In addition, the pressing mold 92 has a projecting part 92A formed in an annular shape projecting inward in the radial direction of the pressing mold 92.

The inner diameter (D5 in FIG. 5) of the projecting part 92A is larger than the outer diameter (D1 in FIG. 5) of the cylindrical mold 80 and is smaller than the outer diameter (D3 in FIG. 5) of the cylindrical member 100 after molding by impact processing.

In this configuration, when the cylindrical mold 80 provided with the cylindrical member 100 is moved downward so that the cylindrical member 100 is passed through the inside of the pressing mold 92, the pressing mold 92 presses the cylindrical member 100 against the outer peripheral surface of the cylindrical mold 80.

Figure 11:
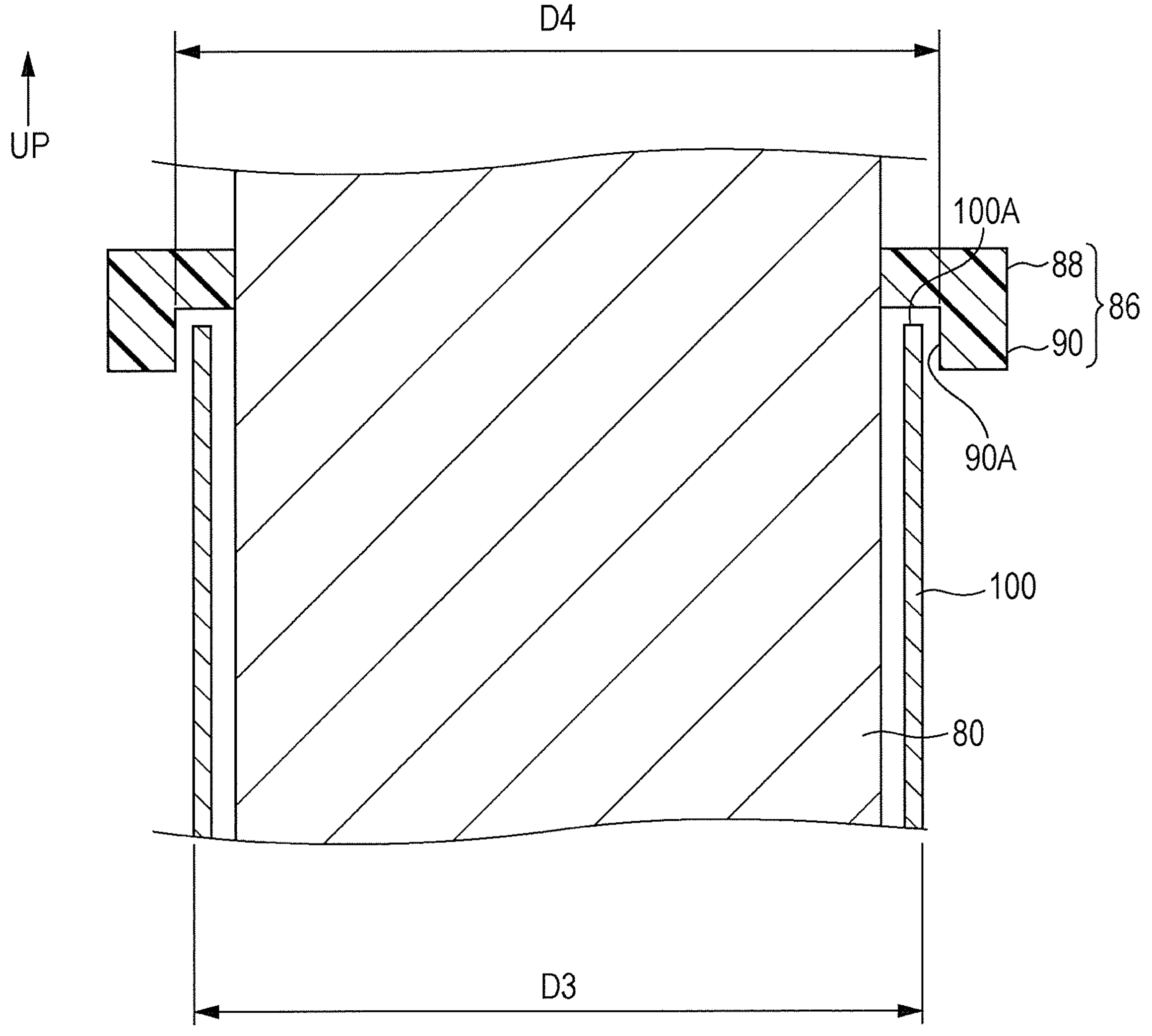
FIG. 11 is an enlarged sectional view showing a mold structure according to an exemplary embodiment of the present disclosure.

The suppression member 86 is formed by, for example, using a nylon resin, and, as shown in FIG. 2, it has an annular shape. Also, as shown in FIG. 11, the suppression member 86 has a cylindrical part 88, which has the inner peripheral surface in contact with the outer peripheral surface of the cylindrical mold 80, and a projecting part 90 projecting downward from the cylindrical part 88. Specifically, in the cylindrical part 88, the projecting part 90 projects downward from the outer portion in the radial direction of the cylindrical part 88. In addition, the projecting part 90 has a suppression surface 90A facing the outer peripheral surface on the one end 100A side of the cylindrical member 100 in the state where the cylindrical member 100 is attached to the cylindrical mold 80. Further, the suppression surface 90A has a circular shape as viewed in the vertical direction (the axial direction of the cylindrical mold 80). The inner diameter (D4 in the drawing) of the suppression surface 90A of the suppression member 86 is larger than the outer diameter (D3 in the drawing) of the cylindrical member 100 after molding by impact processing.

In this configuration, in the state where the cylindrical member 100 is attached to the cylindrical mold 80, the suppression member 86 suppresses the motion of the one end 100A of the cylindrical member 100 in the radial direction (lateral direction in the drawing) of the cylindrical mold 80. Further, when force in the vertical direction (the axial direction of the cylindrical mold 80) is loaded on the suppression member 86, the suppression member 86 slides on the outer peripheral surface of the cylindrical mold 80.

Figure 9:
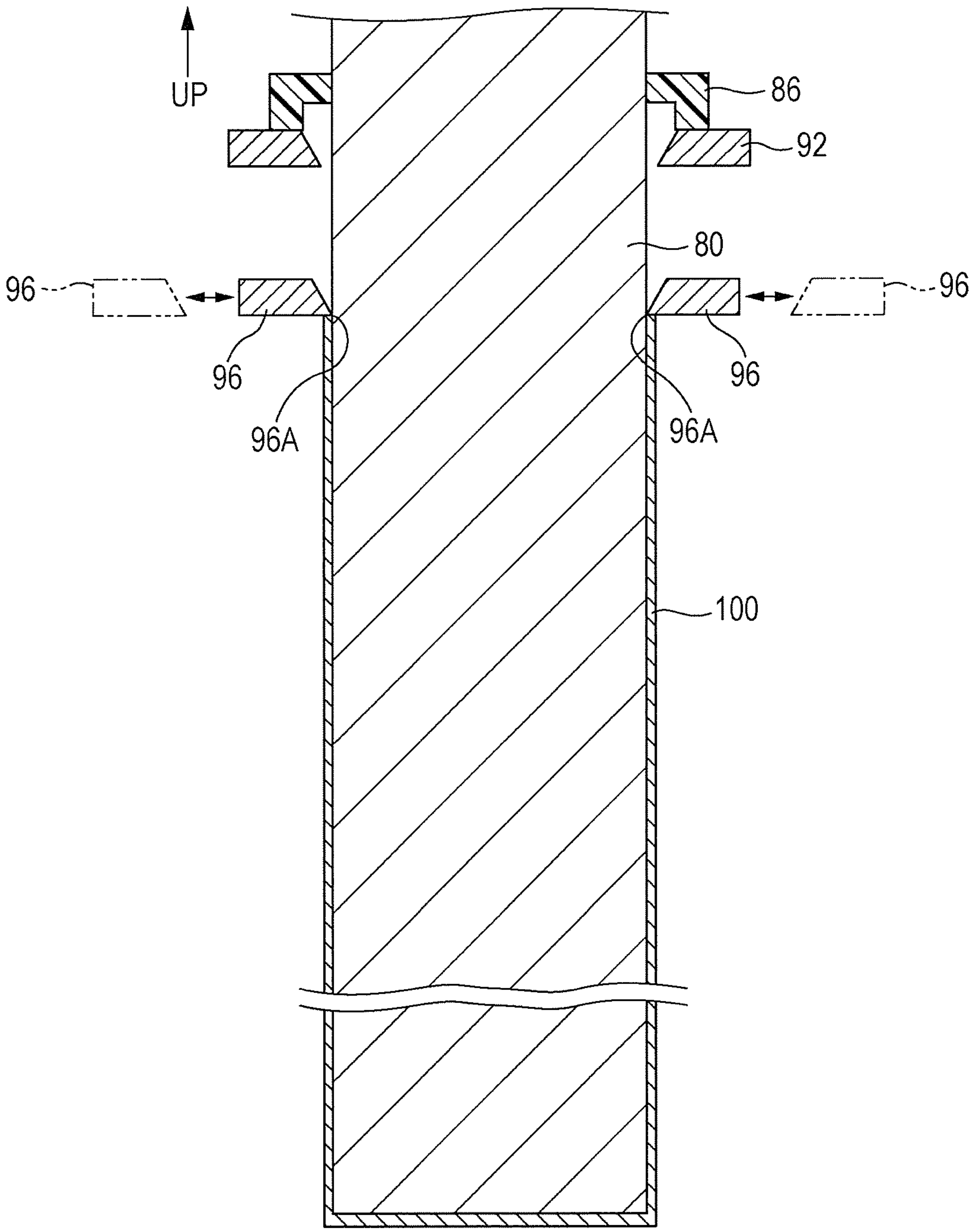
FIG. 9 is a sectional view showing a mold structure according to an exemplary embodiment of the present disclosure.

The release member 96 is formed by, for example, using a metal material, and, as shown in FIG. 9, it is provided at two positions lower the suppression mold 92 so as to hold, in the radial direction of the cylindrical mold 80, a portion of the cylindrical mold 80 moved downward from the pressing mold 92. Also, the release member 96 at each of the positions has a projection 96A projecting to the outer peripheral surface of the cylindrical mold 80.

In this configuration, driving force is transmitted to the release member 96 at each of the positions from a driving source (not shown) so as to move the release member 96 in the direction (lateral direction in the drawing) crossing the axial direction of the cylindrical mold 80. Each of the release members 96 is moved between a contact position (solid line in the drawing) where the projection 96A comes in contact with the cylindrical mold 80 and a separate position (tow-dot chain line in the drawing) where the projection 96A is separated from the cylindrical mold 80.

The operation of each of the parts of the ironing apparatus 74 is described together with the function described later.

(Blasting Apparatus)

Next, the blasting apparatus 76 is described. In the exemplary embodiment, the blasting apparatus 76 is a sand blasting apparatus.

Figure 3:
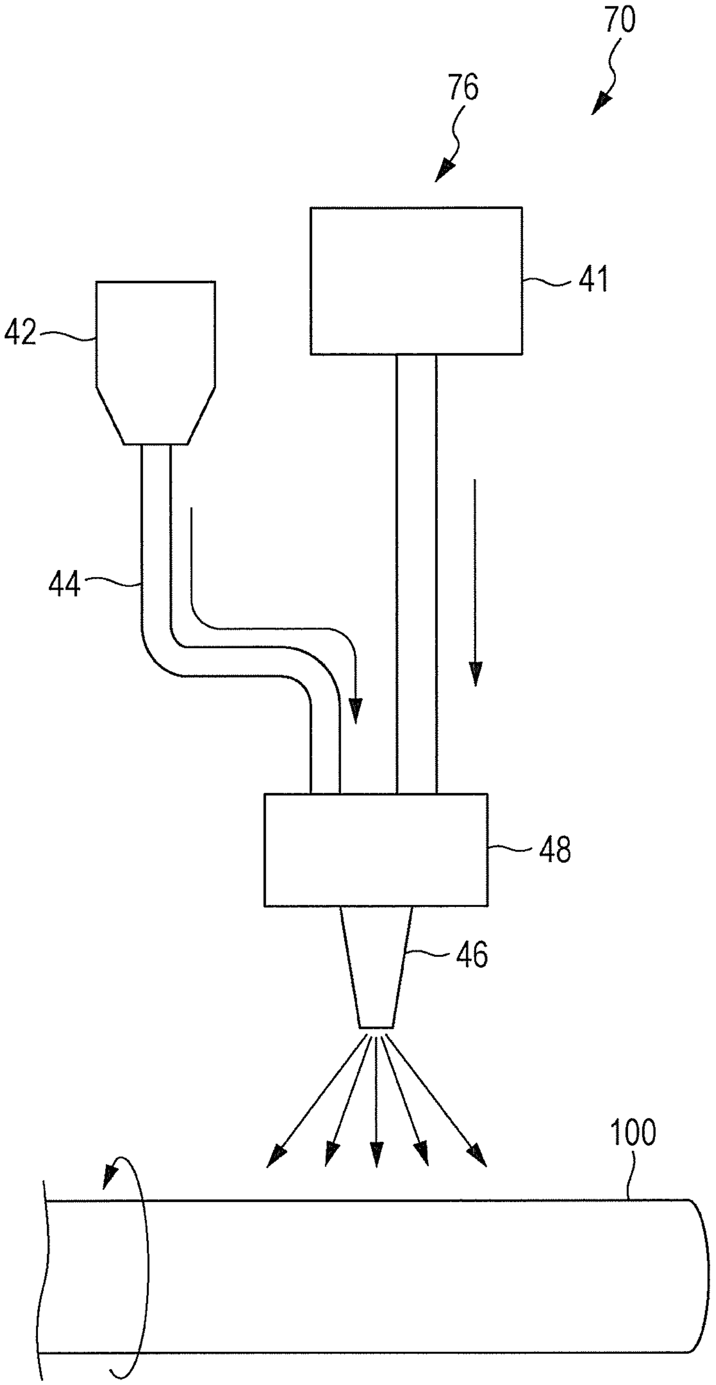
FIG. 3 is a schematic drawing showing a blasting apparatus according to an exemplary embodiment of the present disclosure.

As shown in FIG. 3, the blasting apparatus 76 includes a compressor 41 which supplies compressed air, a tank 42 which contains an abrasive (not shown), a mixing part 48 which mixes the abrasive supplied from the tan 42 through a supply pipe 44 with the compressed air supplied from the compressor 41, and a nozzle 46 which sprays the abrasive to the cylindrical member 100 from the mixing part 48 by ejecting the compressed air.

—Function of Principal Part Configuration—

Next, the function of the principal part configuration is described for production of the cylindrical member 100 using the apparatus 70 for producing a cylindrical member. Specifically, description is made of impact processing, ironing, and blasting.

(Impact Processing)

First, impact processing to mold the cylindrical member 100 by using the impact processing apparatus 72 is described with reference to FIGS. 1A to 1C and FIGS. 4A and 4B.

Impact processing is the process of pressing the slug containing aluminum and disposed in the concave mold 104 by using a cylindrical punch mold 106 to plastically deform the slug 102 on the outer peripheral surface of the punch mold 106, thereby molding the cylindrical member 100.

In the impact processing, as shown in FIG. 1A, first the slug 102 is placed in the concave mold 104, and further the punch mold 106 is disposed above the concave mold 104.

Next, when the punch mold 106 is moved downward, as shown in FIGS. 1B and 1C, the slug 102 placed in the concave mold 104 is crushed and deformed by the punch mold 106. Thus, the slug 102 is deformed into the cylindrical member 100 having a bottom along the peripheral surface of the punch mold 106.

Figure 4B:
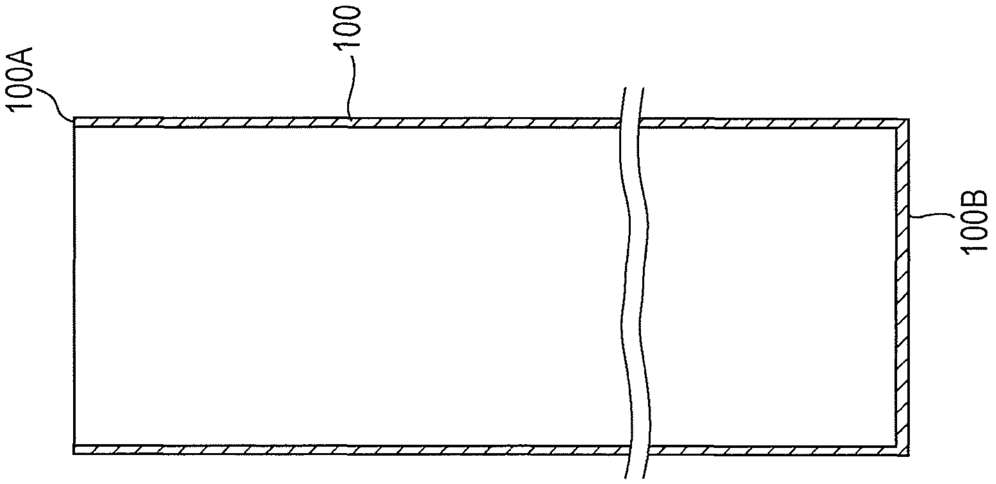
FIGS. 4A and 4B are sectional views showing a mold structure according to an exemplary embodiment of the present disclosure.
Figure 4A:
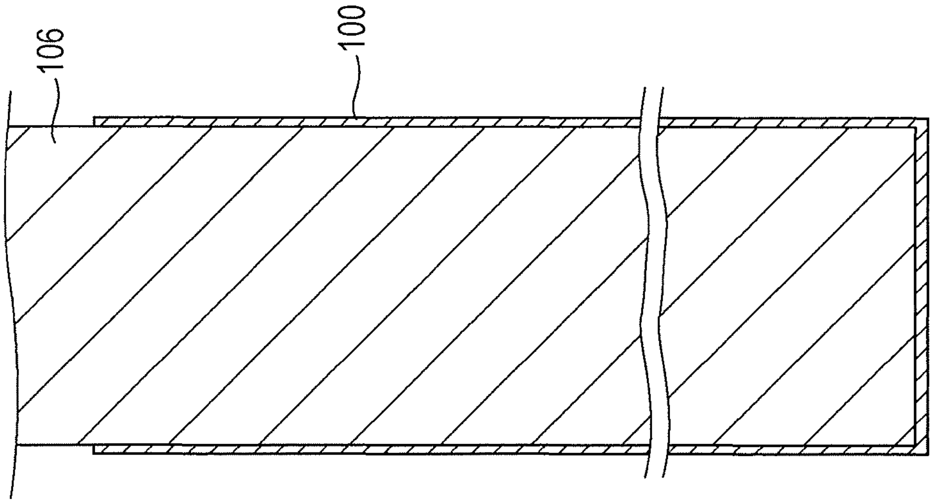

Next, when the punch mold 106 is moved upward, as shown in FIG. 4A, the cylindrical member 100 adhering to the punch mold 106 is separated from the concave mold 104.

Next, as shown in FIG. 4B, the cylindrical member 100 having the open end 100A and the bottom plate 100B at the other end is removed (released) from the punch mold 106.

Thus, the cylindrical member 100 is molded by using the impact processing apparatus 72.

(Ironing)

Next, ironing for correcting the shape of the cylindrical member 100 by using the ironing apparatus 74 is described with reference to FIG. 5 to FIG. 10.

The ironing is the process of ironing the outer peripheral surface of the cylindrical member 100 by passing the molded cylindrical member 100 through the inside of the annular pressing mold 92 having an inner diameter smaller than the outer diameter of the cylindrical member 100.

In the ironing, first, as shown in FIG. 5, in the state where the tip part 80A of the cylindrical mold 80, which has the tip-side part is inserted, comes in contact with the bottom plate 100B of the cylindrical member 100, the cylindrical mold 80 is disposed above the pressing mold 92. In addition, in this state, the suppression surface 90A of the suppression member 86 faces the outer peripheral surface on the end 100A side of the cylindrical member 100. Further, the release member 96 is disposed at the separate position.

Figure 6:
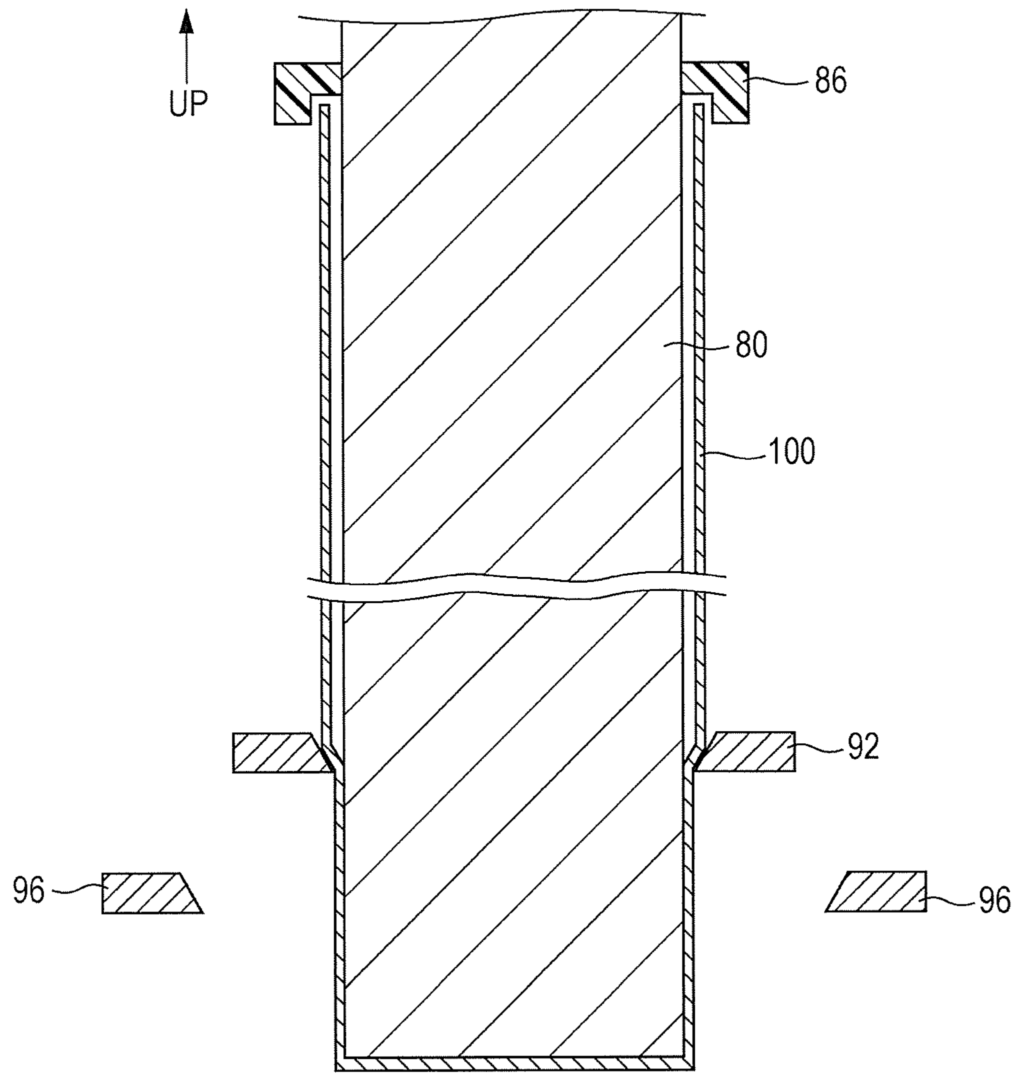
FIG. 6 is a sectional view showing a mold structure according to an exemplary embodiment of the present disclosure.

Next, as shown in FIG. 6, the cylindrical mold 80 is moved downward to pass the cylindrical member 100 through the inside of the pressing mold 92. Thus, the pressing mold 92 presses the cylindrical member 100 against the outer peripheral surface of the cylindrical mold 80.

Therefore, in the cylindrical member 100, the portion passed through the inside of the pressing mold 92 is brought into contact with the outer peripheral surface of the cylindrical mold 80 due to plastic deformation.

Figure 7:
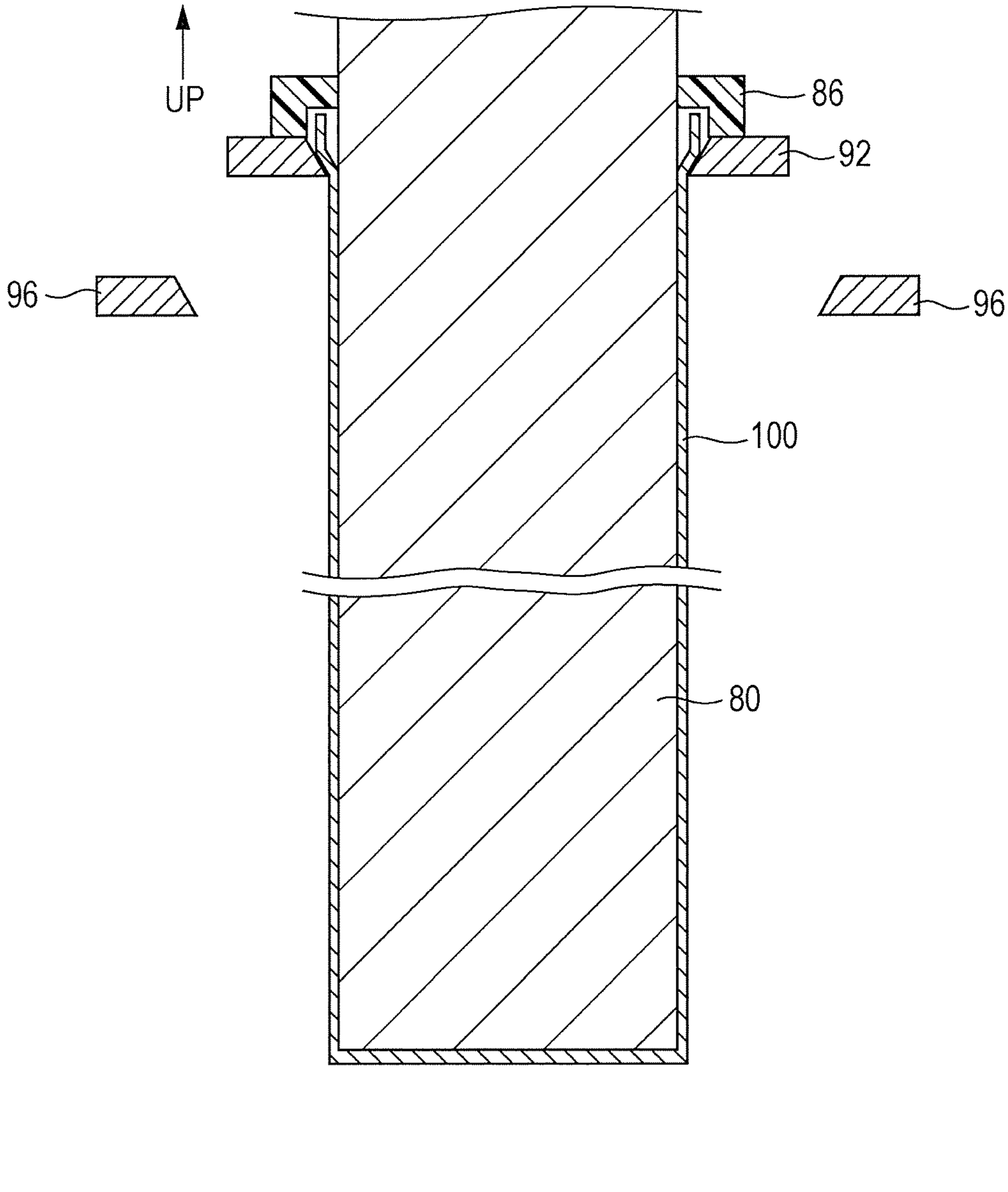
FIG. 7 is a sectional view showing a mold structure according to an exemplary embodiment of the present disclosure.
Figure 8:
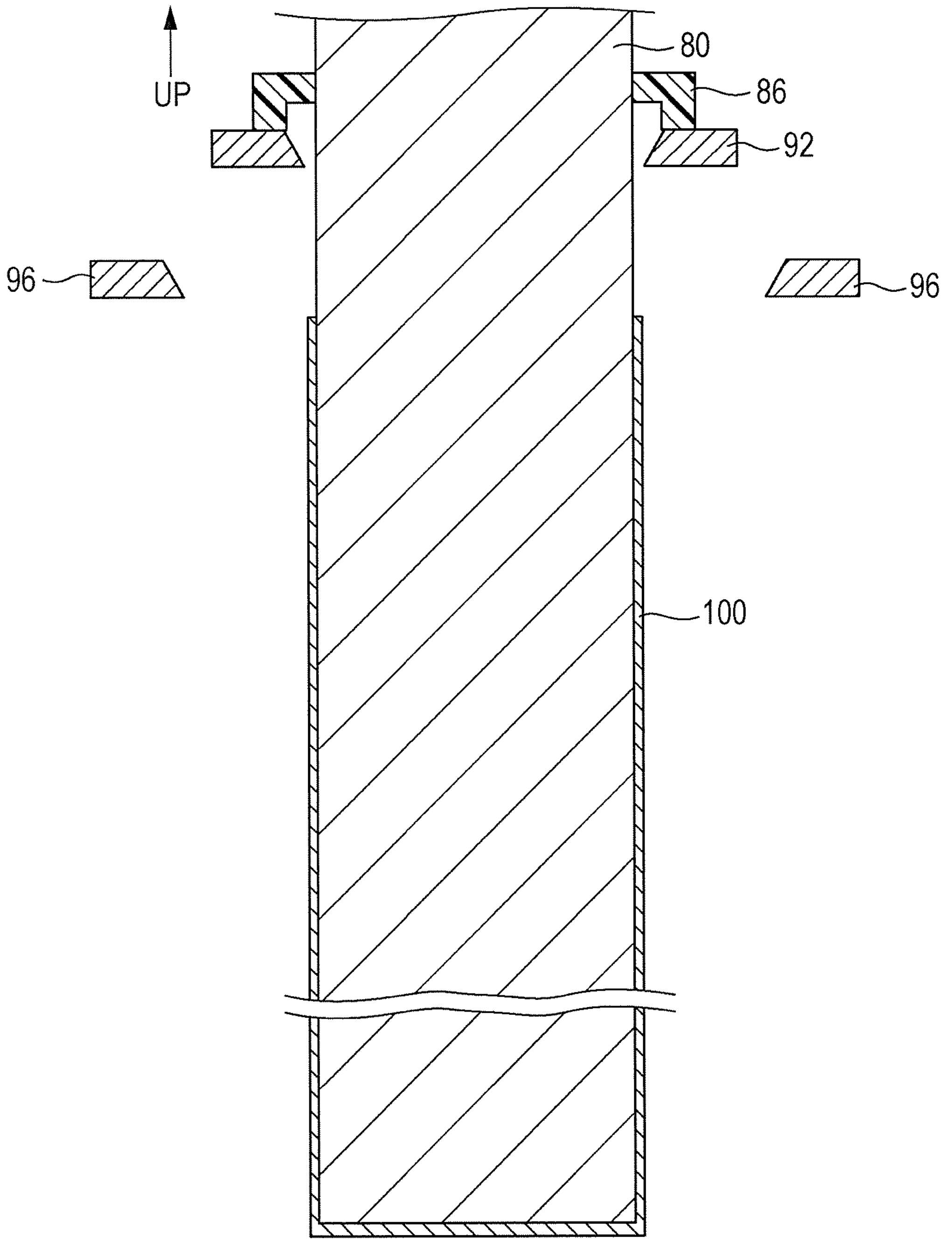
FIG. 8 is a sectional view showing a mold structure according to an exemplary embodiment of the present disclosure.

Next, as shown in FIG. 7, when the cylindrical mold 80 is further moved downward, the suppression member 86 comes in contact with the pressing mold 92. When the cylindrical mold 80 is further moved downward, as shown in FIG. 8, the suppression member 86 slides on the outer peripheral surface of the cylindrical mold 80. The cylindrical member 100 is vertically moved to the side below the release member 96. When the cylindrical member 100 is vertically moved to the side below the release member 96, the downward movement of the cylindrical mold 80 is stopped.

Next, as shown in FIG. 9, the release member 96 is moved from the separate position to the contact position.

Figure 10:
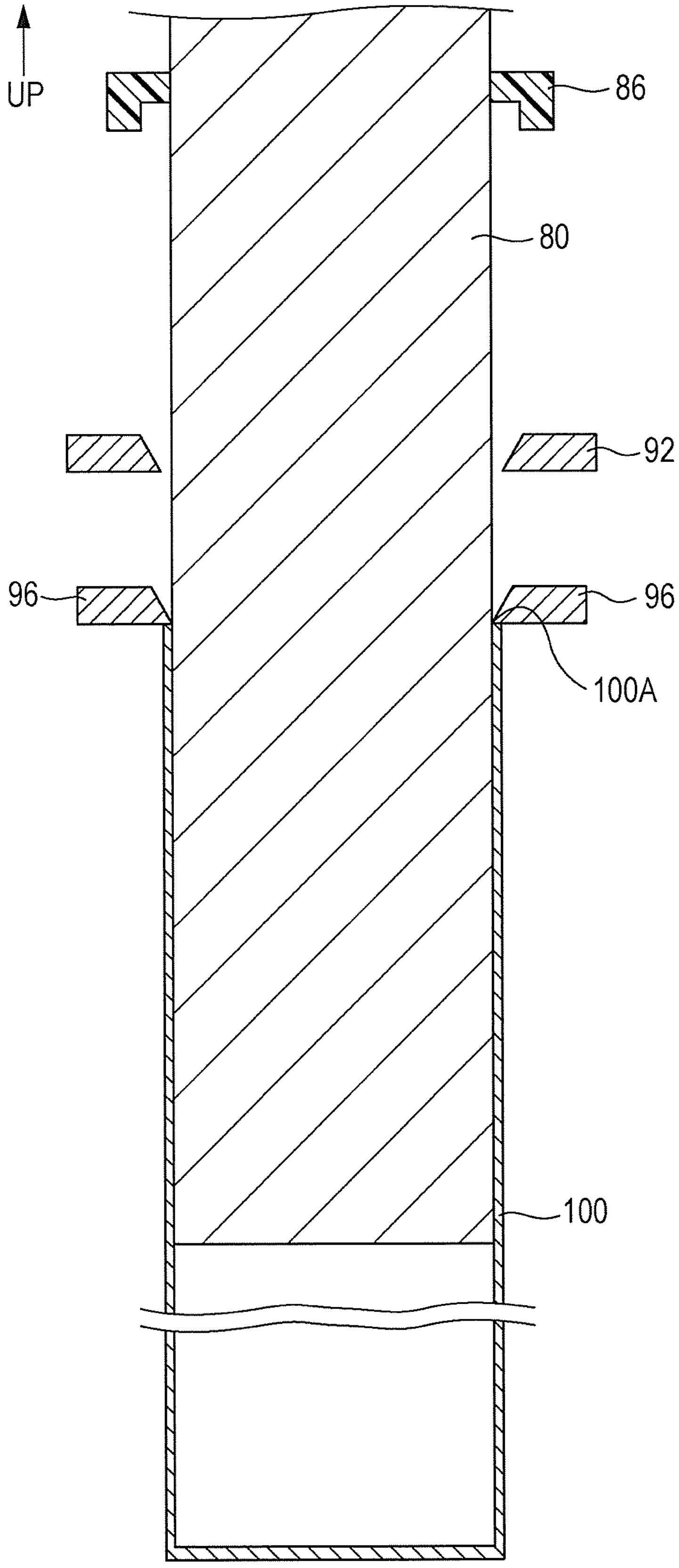
FIG. 10 is a sectional view showing a mold structure according to an exemplary embodiment of the present disclosure.

Next, as shown in FIG. 10, when the cylindrical mold 80 is moved upward, the release member 96 comes in contact with the one end 100A of the cylindrical member 100, and the upward movement of the cylindrical member 100 is regulated by the release member 96. Therefore, the cylindrical member 100 is released from the cylindrical mold 80, completing the ironing.

(Blasting)

Next, blasting to roughen the surface (outer peripheral surface) of the cylindrical member 100 by using the blasting apparatus 76 is described with reference to FIG. 3.

The blasting is a process for imparting irregularities to the outer peripheral surface (roughening the surface) of the cylindrical member 100 after ironing.

In the blasting, first, as shown in FIG. 3, the abrasive stored in the tank 42 is supplied to the mixing part 48 through the supply pipe 44 and, in the mixing part 48, the abrasive is mixed with the compressed air supplied from the compressor 41. Next, the abrasive is sprayed on the cylindrical member 100 by ejecting with the compressed air from the mixing part 48 through the nozzle 46. Thus, the surface of the cylindrical member 100 is roughened. During roughening of the surface of the cylindrical member, the cylindrical member 100 is rotated by the driving force transmitted from the driving source (not shown).

The abrasive is not particularly limited, and a known abrasive can be used. Examples of the known abrasive include metals (for example, stainless, iron, and zinc), ceramics (for example, zirconia, alumina, silica, and silicon carbide), resins (for example, polyamide and polycarbonate), and the like.

The supply source of the compressed air is not particularly limited and, for example, a centrifugal blower other than the compressor 41 may be used or the compressed air may not be used. In addition, the injection medium may be gas other than air.

Further, after the completion of blasting, the bottom plate 100B (refer to FIG. 4B) of the cylindrical member 100 is cut off to produce a conductive support (cylindrical member after molding) according to the first exemplary embodiment. The bottom plate 100B may be cut off after impact processing or ironing.

<Application of Support>

Applications of the support are not particularly limited.

Among supports, examples of a support, which has a layer formed on the outer peripheral surface thereof by a dip coating method and which is used while the inner peripheral surface of the support is held, include a support for an electrophotographic photoreceptor, a support for a fixing roller, and the like.

For example, an electrophotographic photoreceptor is produced by forming a photosensitive layer etc. on the outer peripheral surface of the support for an electrophotographic photoreceptor by a dip coating method. In addition, a fixing roller is produced by forming an elastic layer etc. on the outer peripheral surface of the support for a fixing roller by a dip coating method. Further, a flange is attached to both ends in the axial direction of the support of each of the resultant electrophotographic photoreceptor and the fixing roller, which is thus rotated in the state where the inner peripheral surface of the support is held by the flanges.

Also, among supports, examples of a support, which is reused after removing the layer formed on the outer peripheral surface by a dip coating method, include a support for belt formation and the like.

For example, a belt is formed on the outer peripheral surface of the support for belt forming by a dip coating method, and the belt formed is separated. The support is reused after removing the remaining materials, and belt formation by the dip coating method and belt separation are repeated.

Hereinafter, described as examples of applications of the support are an electrophotographic photoreceptor which has a layer formed on the outer peripheral surface of a support by a dip coating method and which is used while the inner peripheral surface of the support is held, and an image forming apparatus and a process cartridge each using the electrophotographic photoreceptor.

[Electrophotographic Photoreceptor]

An electrophotographic photoreceptor according to an exemplary embodiment of the present disclosure includes a conductive support which is the support according to the exemplary embodiment described above, and a photosensitive layer provided on the conductive support.

Figure 12:
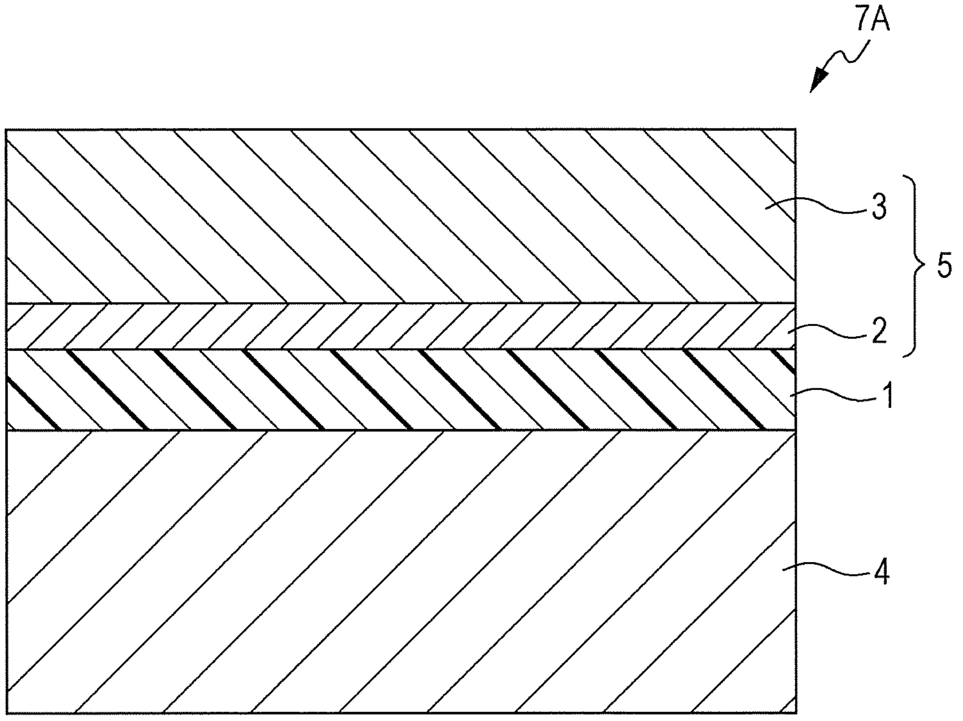
FIG. 12 is a schematic partial sectional view showing an example of a configuration of a photoreceptor according to an exemplary embodiment of the present disclosure.

FIG. 12 is a schematic sectional view showing an example of the layer configuration of an electrophotographic photoreceptor 7A. The electrophotographic photoreceptor 7A shown in FIG. 12 has a structure in which an undercoat layer 1, a charge generation layer 2, and a charge transport layer 3 are laminated in that order on the conductive support 4, and the charge generation layer 2 and the charge transport layer 3 constitute a photosensitive layer 5.

Figure 13:
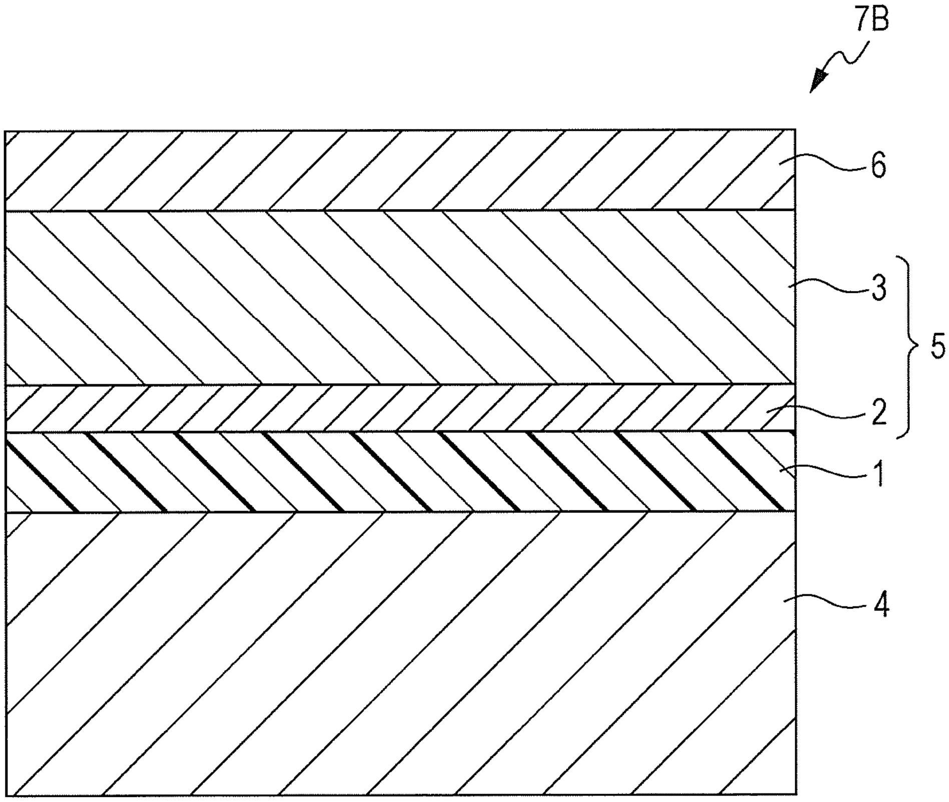
FIG. 13 is a schematic partial sectional view showing another example of a configuration of a photoreceptor according to an exemplary embodiment of the present disclosure.
Figure 14:
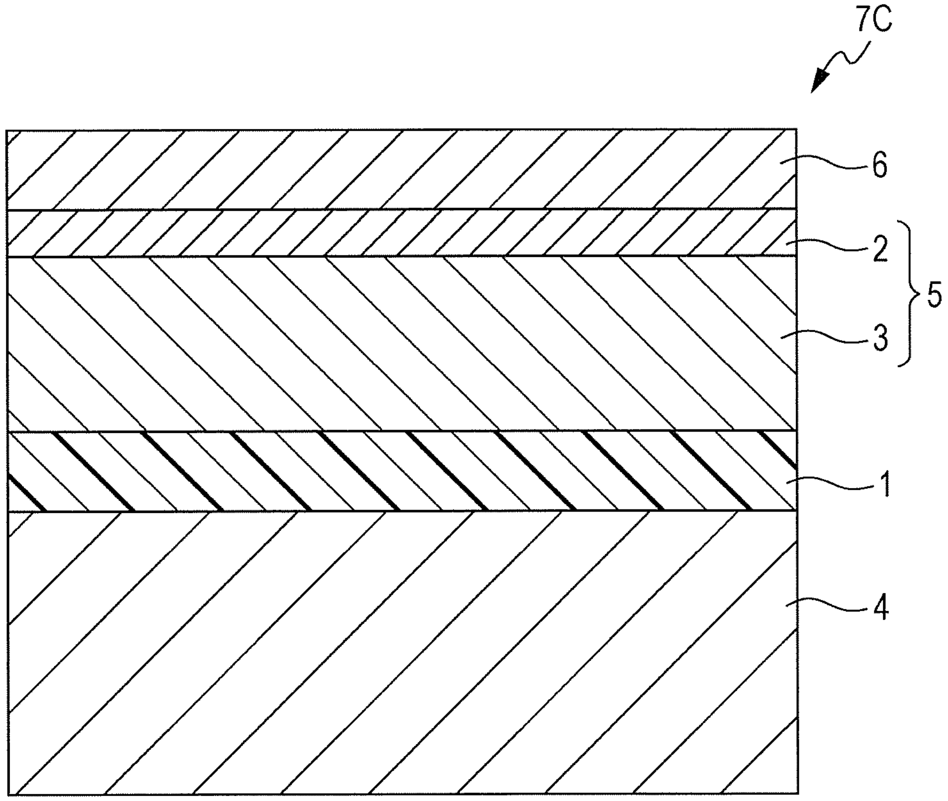
FIG. 14 is a schematic partial sectional view showing a further example of a configuration of a photoreceptor according to an exemplary embodiment of the present disclosure.

FIG. 13 and FIG. 14 are schematic sectional views each showing another example of the layer configuration of the electrophotographic photoreceptor according to the example embodiment.

Like the electrophotographic photoreceptor 7A shown in FIG. 12, each of the electrophotographic photoreceptors 7B and 7C shown in FIG. 13 and FIG. 14, respectively, includes a photosensitive layer 5 having a function divided into a charge generation layer 2 and a charge transport layer 3, and a protective layer 6 formed as an outermost layer. The electrophotographic photoreceptor 7B shown in FIG. 13 has a structure in which the undercoat layer 1, the charge generation layer 2, the charge transport layer 3, and the protective layer 6 are laminated in that order on a conductive support 4. The electrophotographic photoreceptor 7C shown in FIG. 14 has a structure in which the undercoat layer 1, the charge transport layer 3, the charge generation layer 2, and the protective layer 6 are laminated in that order on a conductive support 4.

Each of the electrophotographic photoreceptors 7A to 7C may not be necessarily provided with the undercoat layer 1. Each of the electrophotographic photoreceptors 7A to 7C may include a single-layer type photosensitive layer in which the functions of the charge generation layer 2 and the charge transport layer 3 are integrated.

Each of the layers of the electrophotographic photoreceptor is described in detail below. In the description below, reference numerals are omitted.

(Undercoat Layer)

The undercoat layer is, for example, a layer containing inorganic particles and a binder resin.

The inorganic particles are, for example, inorganic particles having a powder resistance (volume resistivity) of $10^2$ Ωcm or more and $10^{11}$ Ωcm or less.

Among these inorganic particles, the inorganic particles having the resistance value described above are, for example, preferably metal oxide particles such as tin oxide particles, titanium oxide particles, zinc oxide particles, zirconium oxide particles, or the like, and particularly preferably zinc oxide particles.

The BET method specific surface area of the inorganic particles is, for example, preferably 10 $m^2/g$ or more.

The volume average particle diameter of the inorganic particles is, for example, 50 nm or more and 2000 nm or less (preferably 60 nm or more and 1000 nm or less).

The content of the inorganic particles relative to the binder resin is, for example, preferably 10% by weight or more and 80% by weight or less and more preferably 40% by weight or more and 80% by weight or less.

The inorganic particles may be surface-treated. A mixture of two or more types having different surface treatments or different particle diameters may be used as the inorganic particles.

Examples of a surface treatment agent include a silane coupling agent, a titanate-based coupling agent, an aluminum-based coupling agent, a surfactant, and the like. The silane coupling agent is particularly preferred, and the silane coupling agent more preferably has an amino group.

Examples of the silane coupling agent having an amino group include, but are not limited to, 3-aminopropyl triethoxysilane, N-2-(aminoethyl)-3-aminopropyl trimethoxysilane, N-2-(aminoethyl)-3-aminopropyl methyldimethoxysilane, N,N-bis(2-hydroxyethyl)-3-aminopropyl triethoxysilane, and the like.

A mixture of two or more silane coupling agents may be used. For example, the silane coupling agent having an amino group may be used in combination with another silane coupling agent. Examples of the other silane coupling agent include, but are not limited to, vinyltrimethoxysilane, 3-methacryloxypropyl-tris(2-methoxyethoxy) silane, 2-(3,4-epoxycyclohexyl)ethyl trimethoxysilane, 3-glycidoxypropyl trimethoxysilane, vinyltriacetoxysilane, 3-mercaptopropyl trimethoxysilane, 3-aminopropyl triethoxysilane, N-2-(aminoethyl)-3-aminopropyl trimethoxysilane, N-2-(aminoethyl)-3-aminopropyl methyldimethoxysilane, N,N-bis(2-hydroxyethyl)-3-aminopropyl triethoxysilane, 3-chloropropyl trimethoxysilane, and the like.

A method for surface treatment with the surface treatment agent may be any known method, and either a dry method or a wet method may be used.

The amount of treatment with the surface treatment agent relative to the inorganic particles is, for example, preferably 0.5% by weight or more and 10% by weight or less.

The undercoat layer contains an electron-accepting compound (acceptor compound) together with the inorganic particles from the viewpoint of enhancing the long-term stability of electric characteristics and a carrier blocking property.

Examples of the electron-accepting compound include electron transport materials such as quinone compounds, such as chloranil, bromanil, and the like; tetracyanoquinodimethane compounds; fluorenone compounds, such as 2,4,7-trinitrofluorenone, 2,4,5,7-tetranitro-9-fluorenone, and the like; oxadiazole compounds, such as 2-(4-biphenyl)-5-(4-tert-butylphenyl)-1,3,4-oxadiazole, 2,5-bis(4-naphthyl)-1,3, 4-oxadiazole, 2,5-bis(4-diethylaminophenyl)-1,3,4-oxadiazole, and the like; xanthone compounds; thiophene compounds; diphenoquinone compounds, such as 3,3',5,5'-tetra-tert-butyldiphenoquinone and the like; and the like.

A compound having an anthraquinone structure is particularly preferred as the electron-accepting compound. Preferred examples of the compound having an anthraquinone structure include hydroxyanthraquinone compounds, aminoanthraquinone compounds, aminohydroxyanthraquinone compounds, and the like. Specific examples thereof include anthraquinone, alizarin, quinizarin, anthrarufin, purpurin, and the like.

The electron-accepting compound may be contained in a state of being dispersed together with the inorganic particles in the undercoat layer or may be contained in a state of adhering to the surfaces of the inorganic particles.

Examples of a method for adhering the electron-accepting compound to the surfaces of the inorganic particles include a dry method and a wet method.

The dry method is, for example, a method for adhering the electron-accepting compound to the surfaces of the inorganic particles by dropping or spraying, together with dry air or nitrogen gas, the electron-accepting compound directly or in the form of a solution in an organic solvent. The electron-accepting compound is preferably dropped or sprayed at a temperature equivalent to or lower than the boiling point of the solvent. After the electron-accepting compound is dropped or sprayed, baking may be further performed at 100° C. or more. The baking is not particularly limited as long as the temperature and time are determined so as to obtain electrophotographic characteristics.

The wet method is, for example, a method for adhering the electron-accepting compound to the surfaces of the inorganic particles by adding the electron-accepting compound while dispersing the inorganic particles by stirring, ultrasonic waves, a sand mill, an attritor, a ball mill, or the like, stirring or dispersing the resultant mixture, and then removing a solvent. A method for removing the solvent is, for example, filtration or distillation off. After the solvent is removed, baking may be further performed at 100° C. or more. The baking is not particularly limited as long as the temperature and time are determined so as to obtain electrophotographic characteristics. In the wet method, the water contained in the inorganic particles may be removed before the electron-accepting compound is added. For example, a method of removing the water under stirring and heating in the solvent or a method of removing the water by azeotropy with the solvent can be used.

The electron-accepting compound may be adhered before or after surface treatment of the inorganic particles with the surface treatment agent or may be adhered at the same time as surface treatment with the surface treatment agent.

The content of the electron-accepting compound relative to the inorganic particles is, for example, 0.01% by weight or more and 20% by weight or less and preferably 0.01% by weight or more and 10% by weight or less.

Examples of the binder resin used in the undercoat layer include known materials such as known polymer compounds, such as an acetal resin (for example, polyvinyl butyral or the like), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, an epoxy resin, and the like; zirconium chelate compounds; titanium chelate compounds; aluminum chelate compounds; titanium alkoxide compounds; organic titanium compounds; silane coupling agents; and the like.

Other examples of the binder resin used in the undercoat layer include charge transport resins having a charge transport group, conductive resins (for example, polyaniline and the like), and the like.

Among these, a resin insoluble in a coating solvent of an upper layer is preferred as the binder resin used in the undercoat layer. Particularly preferred is a resin obtained by reacting at least one resin with a curing agent, the at least one resin being selected from the group including thermosetting resins such as a urea resin, a phenol resin, a phenol-formaldehyde resin, a melamine resin, a urethane resin, an unsaturated polyester resin, an alkyd resin, an epoxy resin, and the like; a polyamide resin; a polyester resin; a polyether resin; a methacrylic resin; an acrylic resin; a polyvinyl alcohol resin; and a polyvinyl acetal resin.

When two or more of these binder resins are used in combination, the mixing ratio is set according to demand.

The undercoat layer may contain various additives for improving electric characteristics, environmental stability, and image quality.

Examples of the additives include known materials such as polycyclic condensed- or azo-electron transport pigments, zirconium chelate compounds, titanium chelate compounds, aluminum chelate compounds, titanium alkoxide compounds, organic titanium compounds, silane coupling agents, and the like. The silane coupling agent is used as the surface treatment agent for the inorganic particles as described above, but may be further added as an additive to the undercoat layer.

Examples of the silane coupling agent as an additive include vinyltrimethoxysilane, 3-methacryloxypropyl-tris (2-methoxyethoxy) silane, 2-(3,4-epoxycyclohexyl)ethyl trimethoxysilane, 3-glycidoxypropyl trimethoxysilane, vinyl triacetoxysilane, 3-mercaptopropyl trimethoxysilane, 3-aminopropyl triethoxysilane, N-2-(aminoethyl)-3-aminopropyl trimethoxysilane, N-2-(aminoethyl)-3-aminopropylmethyl dimethoxysilane, N,N-bis(2-hydroxyethyl)-3-aminopropyl triethoxysilane, 3-chloropropyl trimethoxysilane, and the like.

Examples of the zirconium chelate compounds include zirconium butoxide, zirconium ethyl acetoacetate, zirconium triethanolamine, zirconium acetylacetonate butoxide, zirconium ethyl acetoacetate butoxide, zirconium acetate, zirconium oxalate, zirconium lactate, zirconium phosphonate, zirconium octanoate, zirconium naphthenate, zirconium laurate, zirconium stearate, zirconium isostearate, zirconium methacrylate butoxide, zirconium stearate butoxide, zirconium isostearate butoxide, and the like.

Examples of the titanium chelate compounds include tetraisopropyl titanate, tetra-n-butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanolaminate, polyhydroxytitanium stearate, and the like.

Examples of the aluminum chelate compounds include aluminum isopropylate, monobutoxyaluminum diisopropylate, aluminum butyrate, diethylacetoacetate aluminum diisopropylate, aluminum tris(ethylacetoacetate), and the like.

These additives may be used alone or as a mixture or polycondensate of plural compounds.

The undercoat layer preferably has a Vickers hardness of 35 or more.

In order to suppress moire fringes, the surface roughness (ten-point average roughness) of the undercoat layer is preferably adjusted to 1/(4n) (n is the refractive index of an upper layer) to ½ of the wavelength λ of the exposure laser used.

In order to adjust the surface roughness, resin particles or the like may be added to the undercoat layer. Examples of the resin particles include silicone resin particles, cross-linked polymethyl methacrylate resin particles, and the like. In addition, the surface of the undercoat layer may be polished for adjusting the surface roughness. Examples of a polishing method include puff polishing, sand blast polishing, wet honing, grinding, and the like.

A method for forming the undercoat layer is not particularly limited, and a known forming method can be used. For example, a coating film of a coating solution for forming the undercoat layer, which is prepared by adding the components described above to a solvent, is formed, dried, and, if required, heated.

Examples of the solvent for preparing the coating solution for forming the undercoat layer include known organic solvents, such as alcohol solvents, aromatic hydrocarbon solvents, halogenated hydrocarbon solvents, ketone solvents, ketone alcohol solvents, ether solvents, ester solvents, and the like.

Specific examples of the solvents include usual organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, toluene, and the like.

Examples of a method for dispersing the inorganic particles in preparing the coating solution for forming the undercoat layer include known methods such as a roll mill, a ball mill, a vibrating ball mill, an attritor, a sand mill, a colloid mill, a paint shaker, and the like.

Examples of a method for applying the coating solution for forming the undercoat layer to the support include a blade coating method, a wire bar coating method, a spray coating method, a dip coating method, a bead coating method, an air knife coating method, a curtain coating method, and the like.

The thickness of the undercoat layer is, for example, preferably set within a range of 15 μm or more, more preferably 20 μm or more and 50 μm or less.

(Intermediate Layer)

Although not shown in the drawings, an intermediate layer may be further provided between the undercoat layer and the photosensitive layer.

The intermediate layer is, for example, a layer containing a resin. Examples of the resin used in the intermediate layer include polymer compounds such as an acetal resin (for example, polyvinyl butyral or the like), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, a melamine resin, and the like.

The intermediate layer may be a layer containing an organic metal compound. Examples of the organic metal compound used in the intermediate layer include organic metal compounds each containing a metal atom such as zirconium, titanium, aluminum, manganese, silicon, or the like, and the like.

These compounds used in the intermediate layer may be used alone or as a mixture or polycondensate of plural compounds.

Among these, the intermediate layer is preferably a layer containing an organic metal compound containing a zirconium atom or silicon atom.

A method for forming the intermediate layer is not particularly limited, and a known forming method can be used. For example, a coating film of a coating solution for forming the intermediate layer, which is prepared by adding the components described above to a solvent, is formed, dried, and, if required, heated.

Examples of a coating method for forming the intermediate layer include a dip coating method, a push-up coating method, a wire bar coating method, a spray coating method, a blade coating method, a knife coating method, a curtain coating method, and the like.

The thickness of the intermediate layer is, for example, preferably set within a range of 0.1 μm or more and 3 μm or less. The intermediate layer may be used as the undercoat layer.

(Charge Generation Layer)

The charge generation layer is, for example, a layer containing a charge generation material and a binder resin. The charge generation layer may also be a vapor-deposited layer of the charge generation material. The vapor-deposited layer of the charge generation material is preferred for the use of an incoherence light source such as LED (Light Emitting Diode), an organic EL (Electro-Luminescence) image array, or the like.

Examples of the charge generation material include azo pigments such as bisazo or trisazo pigments, and the like; condensed-ring aromatic pigments such as dibromoanthanthrone and the like; perylene pigments; pyrrolo-pyrrole pigments; phthalocyanine pigments; zinc oxide; trigonal selenium; and the like.

Among these, a metal phthalocyanine pigment or a non-metal phthalocyanine pigment is preferably used as the charge generation material in order to correspond to laser exposure within the near-infrared region. More preferred examples thereof include hydroxyl gallium phthalocyanine, chlorogallium phthalocyanine, dichlorotin phthalocyanine, and titanyl phthalocyanine.

Examples of the charge generation material preferred for coping with laser exposure within the near-ultraviolet region include condensed ring aromatic pigments such as dibromoanthanthrone and the like; thioindigo pigments; porphyrazine compounds; zinc oxide; trigonal selenium; bisazo pigments, and the like.

Even when an incoherence light source such as LED having an emission center wavelength of 450 nm or more and 780 nm or less, an organic EL image array, or the like is used, the charge generation material described above may be used. However, when a thin film of 20 μm or less is used as the photosensitive layer from the viewpoint of resolution, the electric field strength in the photosensitive layer is increased, and charge reduction due to charge injection from a substrate, that is, an image defect referred to as "black spot", easily occurs. This becomes significant when a p-type semiconductor, which easily produces a dark current, such as trigonal selenium, a phthalocyanine pigment, or the like, is used as the charge generation material.

While when a n-type semiconductor such as a condensed-ring aromatic pigment, a perylene pigment, an azo pigment, or the like is used as the charge generation material, little dark current is generated, and thus even with a thin film, an image defect referred to as "black spot" can be suppressed.

In addition, the n-type is determined by the polarity of a flowing photocurrent using a time-of-flight method generally used, and a material which allows electrons to more easily flow than holes as carriers is determined as the n-type.

The binder resin used in the charge generation layer is selected from a wide range of insulating resins, and the binder resin may be selected from organic photoconductive polymers such as poly-N-vinyl carbazole, polyvinyl anthracene, polyvinyl pyrene, polysilane, and the like.

Examples of the binder resin include a polyvinyl butyral resin, a polyarylate resin (a polycondensate of bisphenol and a divalent aromatic carboxylic acid or the like), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, a polyvinyl pyrrolidone resin, and the like. The term "insulating" represents that the volume resistivity is $10^{13}$ Ωcm or more.

These binder resins can be used alone or as a mixture of two or more.

The mixing ratio by weight of the charge generation material to the binder resin is preferably within a range of 10:1 to 1:10.

The charge generation layer may contain other known additives.

A method for forming the charge generation layer is not particularly limited, and a known forming method can be used. For example, a coating film of a coating solution for forming the charge generation layer, which is prepared by adding the components described above to a solvent, is formed, dried, and, if required, heated. The charge generation layer may be formed by vapor deposition of the charge generation material. The formation of the charge generation layer by vapor deposition is particularly preferred when a condensed ring aromatic pigment or perylene pigment is used as the charge generation material.

Examples of the solvent for preparing the coating solution for forming the charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, toluene, and the like. These solvents may be used alone or as a mixture of two or more.

Examples of a method for dispersing particles (for example, the charge generation material) in the coating solution for forming the charge generation layer include media dispersers such as a ball mill, a vibrating ball mill, an attritor, a sand mill, a horizontal sand mill, and the like; media-less dispersers such stirring, an ultrasonic disperser, a roll mill, a high-pressure homogenizer, and the like. The high-pressure homogenizer is, for example, a colliding dispersion method of liquid-liquid collision or liquid-wall collision of a dispersion solution under high pressure, a through dispersion method of passing through a fine flow passage under high pressure, or the like.

During the dispersion, the effective average particle diameter of the charge generation material in the coating solution for forming the charge generation layer is 0.5 μm or less, preferably 0.3 μm or less, and more preferably 0.15 μm or less.

Examples of a method for applying the coating solution for forming the charge generation layer on the undercoat layer (or the intermediate layer) include a blade coating method, a wire bar coating method, a spray coating method, a dip coating method, a bead coating method, an air knife coating method, a curtain coating method, and the like.

The thickness of the charge generation layer is, for example, preferably determined within a range of 0.1 μm or more and 5.0 μm or less and more preferably 0.2 μm or more and 2.0 μm or less.

(Charge Transport Layer)

The charge transport layer is, for example, a layer containing a charge transport material and a binder resin. The charge transport layer may be a layer containing a polymer charge transport material.

Examples of the charge transport material include electron transport compounds such as quinone compounds, such as p-benzoquinone, chloranil, bromanil, anthraquinone, and the like; tetracyanoquinodimethane compounds; fluorenone compounds, such as 2,4,7-trinitrofluorenone and the like; xanthone compounds; benzophenone compounds; cyanovinyl compounds; ethylenic compounds; and the like. Other examples of the charge transport material include hole transport compounds such as triarylamine compounds, benzidine compounds, arylalkane compounds, aryl-substituted ethylenic compounds, stilbene compounds, anthracene compounds, hydrazone compounds, and the like. These charge transport materials can be used alone or in combination of two or more, but the charge transport material is not limited to these.

From the viewpoint of charge mobility, the charge transport material is preferably a triarylamine derivative represented by structural formula (a-1) below and a benzidine derivative represented by structural formula (a-2) below.

(a-1)

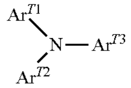

In the structural formula (a-1), $Ar^{T1}$, $Ar^{T2}$, and $Ar^{T3}$ each independently represent a substituted or unsubstituted aryl group, $-C_6H_4-C(R^{T4})=C(R^{T5})(R^{T6})$, or $-C_6H_4-CH=CH-CH=C(R^{T7})(R^{T8})$, wherein $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of a substituent of each of the groups include a halogen atom, an alkyl group having 1 or more and 5 or less carbon atoms, or an alkoxy group having 1 or more and 5 or less carbon atoms. Also, a substituted amino group substituted by an alkyl group having 1 or more and 3 or less carbon atoms may be used as the substituent of each of the groups.

(a-2)

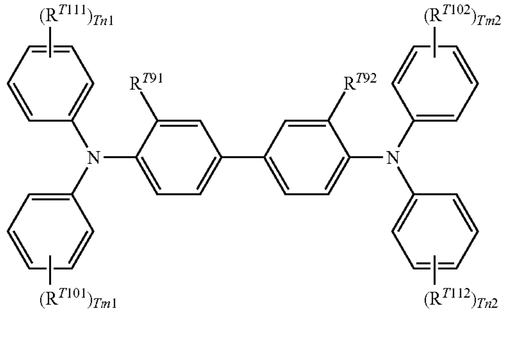

In the structural formula (a-2), $R^{T91}$ and $R^{T92}$ each independently represent a hydrogen atom, a halogen atom, an alkyl group having 1 or more and 5 or less carbon atoms, or an alkoxy group having 1 or more and 5 or less carbon atoms, and $R^{T101}$, $R^{T102}$, $R^{T111}$, and $R^{T112}$ each independently represent a halogen atom, an alkyl group having 1 or more and 5 or less carbon atoms, an alkoxy group having 1 or more and 5 or less carbon atoms, an amino group substituted by an alkyl group having 1 or more and 2 or less carbon atoms, a substituted or unsubstituted aryl group, $-C(R^{T12})=C(R^{T13})(R^{T14})$, or $-CH=CH-CH=C(R^{T15})(R^{T16})$, wherein $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or more and 2 or less.

Examples of a substituent of each of the groups include a halogen atom, an alkyl group having 1 or more and 5 or less carbon atoms, or an alkoxy group having 1 or more and 5 or less carbon atoms. Also, a substituted amino group substituted by an alkyl group having 1 or more and 3 or less carbon atoms may be used as the substituent of each of the groups.

Among the triarylamine derivatives represented by the structural formula (a-1) and the benzidine derivatives represented by the structural formula (a-2), a triarylamine derivative having "$-C_6H_4-CH=CH-CH=C(R^{T7})(R^{T8})$" and a benzidine derivative having "$-CH=CH-CH=C(R^{T15})(R^{T16})$" are particularly preferred from the viewpoint of charge mobility.

Examples used as the polymer charge transport material include known materials having charge transportability, such as poly-N-vinylcarbazole, polysilane, and the like. In particular, polyester-based polymer charge transport materials are particularly preferred. The polymer charge transport materials may be used alone or in combination with the binder resin.

Examples of the binder resin used in the charge transport layer include a polycarbonate resin, a polyester resin, a polyarylate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, polysilane, and the like. Among these, a polycarbonate resin or polyarylate resin is preferred as the binder resin. These binder resins can be used alone or in combination of two or more.

The mixing ratio by weight of the charge transport material to the binder resin is preferably 10:1 to 1:5.

The charge transport layer may contain other known additives.

A method for forming the charge transport layer is not particularly limited, and a known forming method can be used.

For example, a coating film of a coating solution for forming the charge transport layer, which is prepared by adding the components described above to a solvent, is formed, dried, and, if required, heated.

Examples of the solvent for preparing the coating solution for forming the charge transport layer include usual organic solvents, such as aromatic hydrocarbons, such as benzene, toluene, xylene, chlorobenzene, and the like; ketones, such as acetone, 2-butanone, and the like; halogenated aliphatic hydrocarbons, such as methylene chloride, chloroform, ethylene chloride, and the like; cyclic or linear ethers, such as tetrahydrofuran, ethyl ether, and the like; and the like. These solvents may be used alone or as a mixture of two or more.

Examples of a method for applying the coating solution for forming the charge transport layer on the charge generation layer include usual methods such as a blade coating method, a wire bar coating method, a spray coating method, a dip coating method, a bead coating method, an air knife coating method, a curtain coating method, and the like.

The thickness of the charge transport layer is, for example, preferably determined within a range of 5 μm or more and 50 μm or less and more preferably 10 μm or more and 30 μm or less.

(Protective Layer)

If required, a protective layer is provided on the photosensitive layer. The protective layer is provided, for example, for preventing a chemical change of the photosensitive layer during charging and for further improving the mechanical strength of the photosensitive layer.

Therefore, a layer including a cured film (crosslinked film) may be used as the protective layer. Such a layer is, for example, a layer 1) or 2) described below. 1) A layer including a cured film of a composition which contains a reactive group-containing charge transport material having a reactive group and a charge transport skeleton in the same molecule (that is, a layer containing a polymer or crosslinked product of the reactive group-containing charge transport material).

2) A layer including a cured film of a composition which contains a nonreactive charge transport material and a reactive group-containing non-charge transport material having a reactive group without a charge transport skeleton (that is, a layer containing the nonreactive charge transport material and a polymer or crosslinked product of the reactive group-containing non-charge transport material).

Examples of the reactive group of the reactive group-containing charge transport material include known reactive groups such as a chain-polymerizable group, an epoxy group, —OH, —OR [wherein R represents an alkyl group], $-NH_2$, —SH, —COOH, $-SiR^{Q1}_{3-Qn}(OR^{Q2})_{Qn}$ [wherein $R^{Q1}$ represents a hydrogen atom, an alkyl group, or a substituted or unsubstituted aryl group, $R^{Q2}$ represents a hydrogen atom, an alkyl group, or a trialkylsilyl group, and Qn represents an integer of 1 to 3], and the like.

The chain-polymerizable group is not particularly limited as long as it is a radically polymerizable functional group, and is, for example, a functional group having a group containing at least a carbon double bond. Specific examples thereof include a group containing at least one selected from a vinyl group, a vinyl ether group, a vinyl thioether group, a vinyl phenyl group, an acryloyl group, a methacryloyl group, and derivatives thereof, and the like. In particular, in view of excellent reactivity, the chain-polymerizable group is preferably a group containing at least one selected from a vinyl group, a vinyl phenyl group, an acryloyl group, a methacryloyl group, and derivatives thereof.

The charge transport skeleton of the reactive group-containing charge transport material is not particularly limited as long as it has a known structure for an electrophotographic photoreceptor. For example, the skeleton is derived from a nitrogen-containing hole transport compound such as a triarylamine compound, a benzidine compound, a hydrazine compound, or the like, and has a structure conjugated with a nitrogen atom. Among these, a triarylamine skeleton is preferred.

The reactive group-containing charge transport material having the reactive group and the charge transport skeleton, the unreactive charge transport material, and the reactive group-containing non-charge transport material may be selected from known materials.

The protective layer may contain other known additives.

A method for forming the protective layer is not particularly limited, and a known forming method can be used. For example, a coating film of a coating solution for forming the protective layer, which is prepared by adding the components described above to a solvent, is formed, dried, and, if required, cured by heating or the like.

Examples of the solvent for preparing the coating solution for forming the protective layer include aromatic solvents, such as toluene, xylene, and the like; ketone solvents, such as methyl ethyl ketone, methyl isobutyl ketone, cyclohexanone, and the like; ester solvents such as ethyl acetate, butyl acetate, and the like; ether solvents such as tetrahydrofuran, dioxane, and the like; cellosolve solvents such as ethylene glycol monomethyl ether and the like; alcohol solvents such as isopropyl alcohol, butanol, and the like; and the like. These solvents may be used alone or as a mixture of two or more.

The coating solution for forming the protective layer may be a solvent-free coating solution.

Examples of a method for applying the coating solution for forming the protective layer on the photosensitive layer (for example, the charge transport layer) include a dip coating method, a push-up coating method, a wire bar coating method, a spray coating method, a blade coating method, a knife coating method, a curtain coating method, and the like.

The thickness of the protective layer is, for example, preferably determined within a range of 1 μm or more and 20 μm or less and more preferably 2 μm or more and 10 μm or less.

(Single-Layer Photosensitive Layer)

A single-layer photosensitive layer (charge generation/charge transport layer) is, for example, a layer containing a charge generation material, a charge transport material, and, if required, a binder resin and other known additives. These materials are the same as the materials described for the charge generation layer and the charge transport layer.

The content of the charge generation material in the single-layer photosensitive layer is 0.1% by weight or more and 10% by weight or less and preferably 0.8% by weight or more and 5% by weight or less relative to the total solid content. The content of the charge transport material in the single-layer photosensitive layer is 5% by weight or more and 50% by weight or less relative to the total solid content.

A method for forming the single-layer photosensitive layer is the same as the method for forming the charge generation layer and the charge transport layer.

The thickness of the single-layer photosensitive layer is, for example, preferably determined within a range of 5 μm or more and 50 μm or less and more preferably 10 μm or more and 40 μm or less.

[Image Forming Apparatus (and Process Cartridge)]

An image forming apparatus according to an exemplary embodiment of the present disclosure includes an electrophotographic photoreceptor, a charging unit which charges the surface of the electrophotographic photoreceptor, an electrostatic latent image forming unit which forms an electrostatic latent image on the charged surface of the electrophotographic photoreceptor, a developing unit which forms a toner image by developing the electrostatic latent image formed on the surface of the electrophotographic photoreceptor with a developer containing a toner, and a transfer unit which transfers the toner image to the surface of a recording medium. The electrophotographic photoreceptor according to the exemplary embodiment described above is used as the electrophotographic photoreceptor.

Examples applied to the image forming apparatus according to the exemplary embodiment include known image forming apparatuses such as an apparatus including a fixing unit which fixes a toner image transferred to the surface of a recording medium; an apparatus of a direct transfer system in which a toner image formed on the surface of an electrophotographic photoreceptor is transferred directly to a recording medium; an apparatus of an intermediate transfer system in which a toner image formed on the surface of an electrophotographic photoreceptor is first transferred to the surface of an intermediate transfer body, and the toner image transferred to the surface of the intermediate transfer body is second transferred to the surface of a recording medium; an apparatus including a cleaning unit which cleans the surface of an electrophotographic photoreceptor after transfer of a toner image and before charging; an apparatus including a static eliminating unit which eliminates electricity by irradiating the surface of an electrophotographic photoreceptor with static eliminating light after transfer of a toner and before charging; an apparatus including an electrophotographic photoreceptor heating member which decreases a relative temperature by increasing the temperature of an electrophotographic photoreceptor; and the like.

In the case of the apparatus of an intermediate transfer system, a configuration applied to the transfer unit includes, for example, an intermediate transfer body to the surface of which a toner image is transferred, a first transfer unit which first transfers the toner image formed on the surface of the electrophotographic photoreceptor to the surface of the intermediate transfer body, and a second transfer unit which second transfers the toner image transferred to the surface of the intermediate transfer body to the surface of a recording medium.

The image forming apparatus according to the exemplary embodiment may be either an image forming apparatus of a dry development system or an image forming apparatus of a wet development system (development system using a liquid developer).

In the image forming apparatus according to the exemplary embodiment, for example, a part provided with the electrophotographic photoreceptor may have a cartridge structure (process cartridge) detachable from the image forming apparatus. For example, a process cartridge provided with the electrophotographic receptor according to the exemplary embodiment is preferably used as the process cartridge. Besides the electrophotographic photoreceptor, the process cartridge may include, for example, at least one selected from the group consisting of a charging unit, an electrostatic latent image forming unit, a developing unit, and a transfer unit.

An example of the image forming apparatus according to the exemplary embodiment is described below, but the image forming apparatus is not limited to this. The principal parts shown in the drawings are described below, and the other parts are not described.

Figure 15:
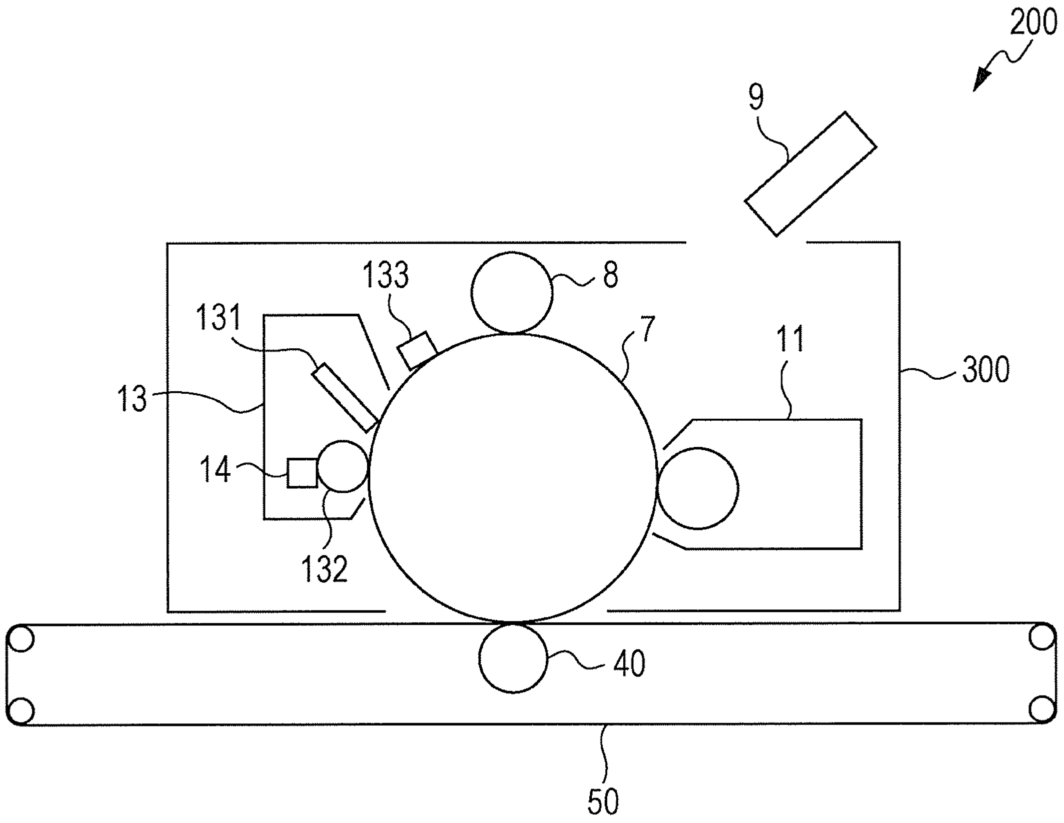
FIG. 15 is a schematic configuration diagram showing an example of an image forming apparatus according to an exemplary embodiment of the present disclosure.

FIG. 15 is a schematic configuration diagram showing an example of the image forming apparatus according to the exemplary embodiment.

As shown in FIG. 15, an image forming apparatus 200 according to the exemplary embodiment includes a process cartridge 300 provided with an electrophotographic photoreceptor 7, an exposure device 9 (an example of the electrostatic latent image forming unit), a transfer device 40 (first transfer device), and an intermediate transfer body 50.

In the image forming apparatus 200, the exposure device 9 is disposed at a position where the electrophotographic photoreceptor 7 can be exposed from an opening of the process cartridge 300, the transfer device 40 is disposed at a position facing the electrophotographic photoreceptor 7 through the intermediate transfer body 50, and the intermediate transfer body 50 is disposed so as to be partially in contact with the electrophotographic photoreceptor 7. Although not shown in the drawings, there is also provided a second transfer device which transfers a toner image transferred to the intermediate transfer body 50 to a recording medium (for example, paper). The intermediate transfer body 50, the transfer device 40 (first transfer device), and the second transfer device (not shown) correspond to an example of the transfer unit.

The process cartridge 300 shown in FIG. 15 includes a housing in which the electrophotographic photoreceptor 7, a charging device 8 (an example of the charging unit), a developing device 11 (an example of the developing unit), and a cleaning device 13 (an example of the cleaning unit) are integrally supported. The cleaning device 13 has a cleaning blade (an example of the cleaning member) 131 which is disposed in contact with the surface of the electrophotographic photoreceptor 7. The cleaning member may not have the form of the cleaning blade 131 and may be a conductive or insulating fibrous member, which may be used singly or in combination with the cleaning blade 131.

FIG. 15 shows an example of the image forming apparatus which includes a fibrous member 132 (roll-shaped) which supplies a lubricant 14 to the surface of the electrophotographic photoreceptor 7 and a fibrous member 133 (flat brush-shaped) which supports cleaning, and these are disposed according to demand.

Each of the constituent components of the image forming apparatus according to the exemplary embodiment is described below.

—Charging Device—

The charging device 8 used is, for example, a contact-type charger using a conductive or semiconductive charging roller, charging brush, charging film, charging rubber blade, charging pipe, or the like. Also used is a known charger such as a non-contact type roller charger, a scorotron charger or corotron charger using corona discharge, or the like.

—Exposure Device—

The exposure device 9 is, for example, an optical system device in which the surface of the electrophotographic photoreceptor 7 is exposed in a predetermined image pattern with light such as semiconductor laser light, LED light, liquid crystal shutter light, or the like. The wavelength of a light source is within the spectral sensitivity range of the electrophotographic photoreceptor. The mainstream of the semiconductor laser is near-infrared light having an oscillation wavelength near 780 nm. However, the wavelength is not limited to this, and a laser having an oscillation wavelength of the order of 600 nm or a blue laser having an oscillation wavelength of 400 nm or more and 450 nm or less may be used. Also, a surface-emission laser light source of a type capable of outputting multi-beams is effective for forming color images.

—Developing Device—

The developing device 11 is, for example, a general developing derive which develops by contact or non-contact with the developer. The developing device 11 is not particularly limited as long as it has the function described above and is selected according to the purpose. Examples thereof include a known developing unit having the function of adhering a one-component developer or two-component developer to the electrophotographic photoreceptor 7 by using a brush, a roller, or the like, and the like. In particular, a developing roller holding the developer on the surface thereof is preferably used.

The developer used in the developing device 11 may be either a one-component developer containing only a toner or a two-component developer containing a toner and a carrier. The developer may be either magnetic or nonmagnetic. A known developer is applied to the developer.

—Cleaning Device—

The cleaning device 13 used is a cleaning blade-system device provided with the cleaning blade 131.

Other than the cleaning blade system, a fur brush cleaning system and a simultaneous development cleaning system may be used.

—Transfer Device—

Examples of the transfer device 40 include known transfer chargers such as a contact-type transfer charger using a belt, a roller, a film, a rubber blade, or the like, a scorotron transfer charger or corotron transfer charger using corona discharge, and the like.

—Intermediate Transfer Body—

The intermediate transfer body 50 used is a belt-shaped body (intermediate belt) containing polyimide, polyamide-imide, polycarbonate, polyarylate, polyester, rubber or the like, which is imparted with semiconductivity. The form of the intermediate transfer body used may be a drum shape other than the belt shape.

Figure 16:
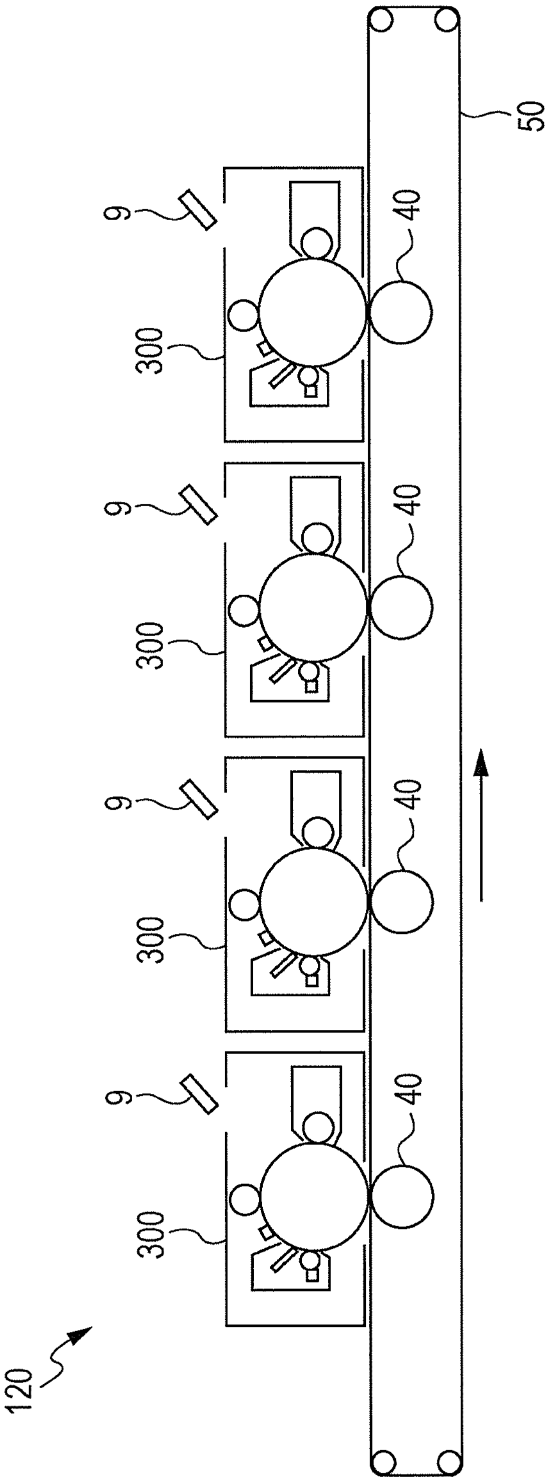
FIG. 16 is a schematic configuration diagram showing another example of an image forming apparatus according to an exemplary embodiment of the present disclosure.

FIG. 16 is a schematic configuration diagram showing another example of the image forming apparatus according to the exemplary embodiment.

An image forming apparatus 120 shown in FIG. 16 is a tandem-system multicolor image forming apparatus provided with four process cartridges 300. The image forming apparatus 120 has a configuration in which the four process cartridges 300 are disposed in parallel on the intermediate transfer body 50, and one electrophotographic photoreceptor is used for one color. The image forming apparatus 120 has the same configuration as the image forming apparatus 200 except that it is a tandem system.

EXAMPLES

Examples of the present disclosure are described below, but the present disclosure is not limited to these examples below. In addition, "parts" represents "parts by weight" unless otherwise specified.

<Formation of Conductive Support>

—Formation of Conductive Support (1)—

A aluminum-made cylindrical slug having a diameter of 34 mm and a thickness of 15 mm is prepared by punching out an aluminum plate having a thickness of 15 mm and made of JIS name "1050 alloy" having an aluminum purity of 99.5% or more. A lubricant is applied to the slug, and then a cylindrical member having a diameter of 34 mm is molded by impact processing.

Next, a lubricant having a dynamic viscosity of 365 $mm^2/s$ at 40° C. is applied to the outer peripheral surface of a punch having the outer peripheral surface with an arithmetic average roughness Ra of 0.30 μm, and an aluminum-made conductive support (1) having a diameter of 30 mm, a length of 251 mm, and a thickness of 0.7 mm is formed by one time of ironing.

Table 1 shows the results of measurement of the arithmetic average roughness Ra, maximum height roughness Rz, and glossiness of the inner peripheral surface at an end in the axial direction of the resultant conductive support by the methods described above.

—Formation of Conductive Support (2)—

A cylindrical member having a diameter of 34 mm is formed by the same impact processing as for the conductive support (1).

Next, a lubricant having a dynamic viscosity of 110 $mm^2/s$ at 40° C. is applied to the outer peripheral surface of a punch having the outer peripheral surface with an arithmetic average roughness Ra of 0.30 μm, and an aluminum-made conductive support (2) having a diameter of 30 mm, a length of 251 mm, and a thickness of 0.7 mm is formed by one time of ironing.

Table 1 shows the results of measurement of the arithmetic average roughness Ra, maximum height roughness Rz, and glossiness of the inner peripheral surface at an end in the axial direction of the resultant conductive support by the methods described above.

—Formation of Conductive Support (3)—

An aluminum-made cylindrical pipe is formed by drawing, and the inner peripheral surface thereof is polished with a super finishing film (manufactured by Sankyo Rikagaku Co., Ltd., count No: 4000), forming an aluminum-made conductive support (3) having a diameter of 30 mm, a length of 251 mm, and a thickness of 0.7 mm.

Table 1 shows the results of measurement of the arithmetic average roughness Ra, maximum height roughness Rz, and glossiness of the inner peripheral surface at an end in the axial direction of the resultant conductive support by the methods described above.

—Formation of Conductive Support (4)—

An aluminum-made cylindrical pipe is formed by drawing, and the inner peripheral surface thereof is blasted with media (manufactured by Fuji Manufacturing Co., Ltd., Model No: SIZ-D030-5, abrasive particle diameter: 3 μm, core particle diameter: 450 μm) containing abrasive particles held on a polymer compound core, forming an aluminum-made conductive support (4) having a diameter of 30 mm, a length of 251 mm, and a thickness of 0.7 mm.

Table 1 shows the results of measurement of the arithmetic average roughness Ra, maximum height roughness Rz, and glossiness of the inner peripheral surface at an end in the axial direction of the resultant conductive support by the methods described above.

—Formation of Conductive Support (C1)—

An aluminum-made cylindrical pipe is formed by drawing, and the inner peripheral surface thereof is polished, forming an aluminum-made conductive support (C1) having a diameter of 30 mm, a length of 251 mm, and a thickness of 0.7 mm.

Table 1 shows the results of measurement of the arithmetic average roughness Ra, maximum height roughness Rz, and glossiness of the inner peripheral surface at an end in the axial direction of the resultant conductive support by the methods described above.

—Formation of Conductive Support (C2)—

An aluminum-made cylindrical pipe is formed by drawing, and the inner peripheral surface thereof is blasted with glass media (manufactured by Fuji Manufacturing Co., Ltd., Model No: FGB-200-S, particle size #200), forming an aluminum-made conductive support (C2) having a diameter of 30 mm, a length of 251 mm, and a thickness of 0.7 mm.

Table 1 shows the results of measurement of the arithmetic average roughness Ra, maximum height roughness Rz, and glossiness of the inner peripheral surface at an end in the axial direction of the resultant conductive support by the methods described above.

—Formation of Conductive Support (C3)—

An aluminum-made cylindrical pipe is formed by drawing, and an aluminum-made conductive support (C3) having a diameter of 30 mm, a length of 251 mm, and a thickness of 0.7 mm is formed.

Table 1 shows the results of measurement of the arithmetic average roughness Ra, maximum height roughness Rz, and glossiness of the inner peripheral surface at an end in the axial direction of the resultant conductive support by the methods described above.

—Formation of Conductive Support (C4)—

An aluminum-made cylindrical pipe is formed by drawing, and the inner peripheral surface thereof is polished, forming an aluminum-made conductive support (C4) having a diameter of 30 mm, a length of 251 mm, and a thickness of 0.7 mm.

Table 1 shows the results of measurement of the arithmetic average roughness Ra, maximum height roughness Rz, and glossiness of the inner peripheral surface at an end in the axial direction of the resultant conductive support by the methods described above.

—Formation of Conductive Support (C5)—

A cylindrical member having a diameter of 34 mm is formed by the same impact processing as for the conductive support (1).

Next, a lubricant having a dynamic viscosity of 450 $mm^2/s$ at 40° C. is applied to the outer peripheral surface of a punch having the outer peripheral surface with an arithmetic average roughness Ra of 0.8 μm, and an aluminum-made conductive support (C5) having a diameter of 30 mm, a length of 251 mm, and a thickness of 0.7 mm is formed by one time of ironing.

Table 1 shows the results of measurement of the arithmetic average roughness Ra, maximum height roughness Rz, and glossiness of the inner peripheral surface at an end in the axial direction of the resultant conductive support by the methods described above.

<Formation of Photoreceptor>

—Formation of Photoreceptor (1)—

(Formation of Undercoat Layer)

First, 100 parts by weight of zinc oxide (average particle diameter: 70 nm, manufactured by TAYCA CORPORATION, specific surface area: 15 $m^2/g$) and 500 parts by weight of tetrahydrofuran are stirred and mixed, and 1.3 parts by weight of a silane coupling agent (KBM503: manufactured by Shin-Etsu Chemical Co., Ltd.) is added to the resultant mixture and stirred for 2 hours. Then, tetrahydrofuran is removed by reduced-pressure distillation, and the residue is baked at 120° C. for 3 hours to produce silane coupling agent-treated zinc oxide.

Then, 110 parts by weight of the silane coupling agent-treated zinc oxide and 500 parts by weight of tetrahydrofuran are stirred and mixed, and a solution prepared by dissolving 0.6 parts by weight of alizarin in 50 parts by weight of tetrahydrofuran is added to the resultant mixture and then stirred at 50° C. for 5 hours. Then, alizarin-added zinc oxide is filtered off by reduced-pressure filtration and further dried at 60° C. under reduced pressure, producing alizarin-added zinc oxide.

Then, 60 parts by weight of the alizarin-added zinc oxide, 13.5 parts by weight of a curing agent (blocked isocyanate, Sumidur 3175, manufactured by Sumitomo Bayer Urethane Co., Ltd.), 38 parts by weight of a mixture prepared by mixing 15 parts by weight of butyral resin (S-Lec BM-1, manufactured by Sekisui Chemical Co., Ltd.) in 85 parts by weight of methyl ether ketone, and 25 parts by weight of methyl ethyl ketone are mixed and dispersed for 2 hours by a sand mill using glass beads of 1 mmϕ, producing a dispersion.

Next, 0.005 parts by weight of dioctyltin dilaurate as a catalyst and 45 parts by weight of silicone resin particles (Tospearl 145, manufactured by Momentive Performance Materials Inc.) are added to the resultant dispersion, producing a coating solution for forming an undercoat layer.

The resultant coating solution for forming an undercoat layer is applied on each of the conductive supports by a dip coating method and then dried and cured at 170° C. for 30 minutes after wiping off the lower-end inside surface, thereby forming an undercoat layer having a thickness of 23 μm.

(Formation of Charge Generation Layer)

Next, 1 part by weight of hydroxygallium phthalocyanine having strong diffraction peaks at Bragg angle positions (2θ±0.2°) of 7.5°, 9.9°, 12.5°, 16.3°, 18.6°, 25.1° and 28.3° in an X-ray diffraction spectrum is mixed with 1 part by weight of polyvinyl butyral (S-Lec BM-S, manufactured by Sekisui Chemical Co., Ltd.) and 80 parts by weight of n-butyl acetate. The resultant mixture is dispersed together with glass beads by a paint shaker to produce a coating solution for forming a charge generation layer.

The coating solution for forming a charge generation layer is applied by dip coating on the conductive support, having the undercoat layer formed thereon, and then dried by heating at 100° C. for 10 minutes after wiping off the lower-end inside surface, thereby forming a charge generation layer having a thickness of 0.15 μm.

(Formation of Charge Transport Layer)

Next, 2.6 parts by weight of a benzidine compound represented by formula (CT-1) below and 3 parts by weight of a polymer compound (viscosity-average molecular weight: 40,000) having a repeat unit represented by formula (B-1) below are dissolved in 25 parts by weight of THF to prepare a coating solution for forming a charge transport layer.

The resultant coating solution for forming a charge transport layer is applied on the charge generation layer by dip coating and then heated at 130° C. for 45 minutes after wiping off the lower-end inside surface to form a charge transport layer having a thickness of 20 μm. Thus, an electrophotographic photoreceptor is produced.

(CT-1)

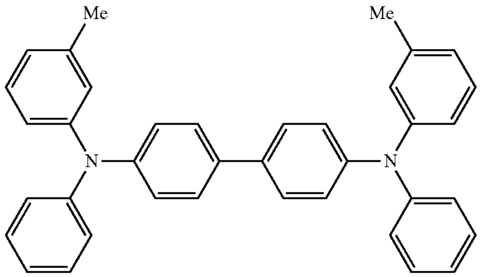

-continued (B-1)

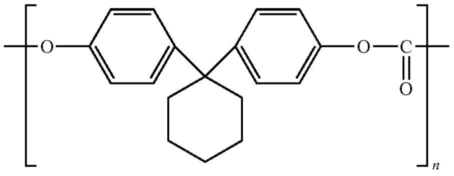

—Formation of Photoreceptors (2) to (4) and (C1) to (c5)—

Electrophotographic photoreceptors are formed by the same method as for the photoreceptor (1) except that the type of the conductive support is changed according to Table 1.

—Formation of Photoreceptor (5)—

An electrophotographic photoreceptor is formed by the same method as for the photoreceptor (1) except that in forming the undercoat layer, the charge generation layer, and the charge transport layer, the coating film is dissolved away by dipping in tetrahydrofuran for 60 seconds in place of wiping off the lower-end inside surface.

—Formation of Photoreceptor (C6)—

An electrophotographic photoreceptor is formed by the same method as for the photoreceptor (C5) except that in forming the undercoat layer, the charge generation layer, and the charge transport layer, the coating film is dissolved away by dipping in tetrahydrofuran for 60 seconds in place of wiping off the lower-end inside surface.

<Evaluation>

—Examination of Inner Surface Remaining Film—

By using 1000 samples of each of the photoreceptors formed in the examples and the comparative examples, the inner peripheral surface at an end in the axial direction is imaged by a CCD camera. Then, the samples having the coating films adhering to the inner peripheral surfaces are selected, and the number of the samples selected is determined. Then, the adhesion positions are measured by a step profiler, and the samples with an adhesion thickness of 3 μm or more are evaluated as "poor" to determine a number of defects and a defect rate. The results are shown in Table 1.

TABLE 1

| | | Conductive support | | | | Evaluation | | |
|---|---|---|---|---|---|---|---|---|
| | Photoreceptor No. | No. | Ra (μm) | Rz (μm) | Glossiness | Number of samples having adhesion | Number of defects | Defect rate (%) |
| Example 1 | 1 | 1 | 0.252 | 2.21 | 250 | 10 | 0 | 0.0 |
| Example 2 | 2 | 2 | 0.154 | 1.49 | 307 | 5 | 0 | 0.0 |
| Example 3 | 3 | 3 | 0.104 | 0.928 | 400 | 2 | 0 | 0.0 |
| Example 4 | 4 | 4 | 0.0520 | 0.505 | 700 | 1 | 0 | 0.0 |
| Example 5 | 5 | 1 | 0.252 | 2.21 | 250 | 15 | 0 | 0.0 |
| Comparative Example 1 | C1 | C1 | 0.245 | 2.56 | 200 | 18 | 4 | 0.4 |
| Comparative Example 2 | C2 | C2 | 0.319 | 2.11 | 183 | 16 | 3 | 0.3 |
| Comparative Example 3 | C3 | C3 | 0.514 | 3.95 | 151 | 32 | 8 | 0.8 |
| Comparative Example 4 | C4 | C4 | 1.55 | 6.34 | 100 | 45 | 10 | 1.0 |
| Comparative Example 5 | C5 | C5 | 0.386 | 2.82 | 226 | 18 | 3 | 0.3 |

TABLE 1-continued

| | | | | | | Evaluation | | |
|---|---|---|---|---|---|---|---|---|
| | | Conductive support | | | | Number of samples | Number | Defect |
| | Photoreceptor No. | No. | Ra (μm) | Rz (μm) | Glossiness | having adhesion | of defects | rate (%) |
| Comparative Example 6 | C6 | C5 | 0.386 | 2.82 | 226 | 63 | 10 | 1.0 |

The results described above indicate that the examples are excellent in the coating film removability from the inner peripheral surface at an end in the axial direction as compared with the comparative examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A cylindrical support for dip coating,
wherein the cylindrical support is a hollow cylinder,
wherein an inner peripheral surface at an end in an axial direction of the cylindrical support has an arithmetic average roughness Ra of 0.26 μm or less and a maximum height roughness Rz of 2.3 μm or less, and an outer peripheral surface is configured to be applied with the dip coating, wherein the support is the support of an electrophotographic photoreceptor.

2. The support for dip coating according to claim 1, wherein the inner peripheral surface has an arithmetic average roughness Ra of 0.20 μm or less and a maximum height roughness Rz of 1.5 μm or less.

3. The support for dip coating according to claim 2, wherein the inner peripheral surface has an arithmetic average roughness Ra of 0.15 μM or less and a maximum height roughness Rz of 1.0 μm or less.

4. The support for dip coating according to claim 1, wherein the arithmetic average roughness Ra and the maximum height roughness Rz of the inner peripheral surface satisfy the following formula (1).

$$7.7 \times Ra \leq Rz \leq 10.4 \times Ra \qquad \text{Formula (1):}$$

5. The support for dip coating according to claim 1, wherein a thickness of the support is 0.1 mm or more and 2.0 mm or less.

6. The support for dip coating according to claim 5, wherein a thickness of the support is 0.2 mm or more and 0.9 mm or less.

7. The support for dip coating according to claim 1, wherein the inner peripheral surface at an end in the axial direction of the support has a glossiness of 250 or more.

8. The support for dip coating according to claim 1, wherein the support is a conductive support.

9. A cylindrical support for dip coating,
wherein the cylindrical support is a hollow cylinder,
wherein an inner peripheral surface at an end in an axial direction of the cylindrical support has a glossiness of 250 or more, and an outer peripheral surface is configured to be apply with the dip coating, wherein the support is the support of an electrophotographic photoreceptor.

10. The support for dip coating according to claim 9, wherein the glossiness is 300 or more.

11. The support for dip coating according to claim 9, wherein the support is a conductive support.

12. An electrophotographic photoreceptor comprising: the support for dip coating according to claim 1; and
a photosensitive layer provided on the support for dip coating.

13. An electrophotographic photoreceptor comprising:
the support for dip coating according to claim 9; and
a photosensitive layer provided on the support for dip coating.

14. A process cartridge detachable from an image forming apparatus, the process cartridge comprising the electrophotographic photoreceptor according to claim 12.

15. A process cartridge detachable from an image forming apparatus, the process cartridge comprising the electrophotographic photoreceptor according to claim 13.

16. An image forming apparatus comprising:
the electrophotographic photoreceptor according to claim 12;
a charging unit that charges a surface of the electrophotographic photoreceptor;
an electrostatic latent image forming unit that forms an electrostatic latent image on the charged surface of the electrophotographic photoreceptor;
a developing unit that forms a toner image by developing the electrostatic latent image, formed on the surface of the electrophotographic photoreceptor, with a developer containing a toner; and
a transfer unit that transfers the toner image to a surface of a recording medium.

17. An image forming apparatus comprising:
the electrophotographic photoreceptor according to claim 13;
a charging unit that charges a surface of the electrophotographic photoreceptor;
an electrostatic latent image forming unit that forms an electrostatic latent image on the charged surface of the electrophotographic photoreceptor;
a developing unit that forms a toner image by developing the electrostatic latent image, formed on the surface of the electrophotographic photoreceptor, with a developer containing a toner; and
a transfer unit that transfers the toner image to a surface of a recording medium.

* * * * *